(12) United States Patent
Tye et al.

(10) Patent No.: US 9,403,099 B2
(45) Date of Patent: *Aug. 2, 2016

(54) MODELING SKIN-COVERED ROBOTICS DEVICES INCLUDING ARTISTIC DIGITAL ITERATIVE DESIGN PROCESSES

(75) Inventors: Bryan S. Tye, Canyon Country, CA (US); Philip John Jackson, Glendale, CA (US)

(73) Assignee: Disney Enterprise, Inc., Burbank, CA (US)

(*) Notice: Subject to any disclaimer, the term of this patent is extended or adjusted under 35 U.S.C. 154(b) by 1249 days.

This patent is subject to a terminal disclaimer.

(21) Appl. No.: 12/971,317

(22) Filed: Dec. 17, 2010

(65) Prior Publication Data

US 2011/0087354 A1    Apr. 14, 2011

Related U.S. Application Data

(63) Continuation-in-part of application No. 12/781,375, filed on May 17, 2010, now Pat. No. 7,887,729, which is a continuation of application No. 12/124,567, filed on May 21, 2008, now Pat. No. 7,718,105.

(51) Int. Cl.
| | |
|---|---|
| A63H 9/00 | (2006.01) |
| B29C 33/38 | (2006.01) |
| B29C 39/02 | (2006.01) |

(52) U.S. Cl.
CPC .............. *A63H 9/00* (2013.01); *B29C 33/3835* (2013.01); *B29C 39/025* (2013.01)

(58) Field of Classification Search
CPC ..... A63H 9/00; B29C 33/3835; B29C 39/025
See application file for complete search history.

(56) References Cited

U.S. PATENT DOCUMENTS

| | | |
|---|---|---|
| 3,150,218 A | 9/1964 | Nassour |
| 4,694,231 A | 9/1987 | Alvite |
| 5,013,508 A | 5/1991 | Troester |
| 5,215,796 A | 6/1993 | Mueller et al. |
| 5,543,225 A | 8/1996 | Mueller et al. |
| 6,072,496 A | 6/2000 | Guenter et al. |
| 6,771,840 B1 | 8/2004 | Ioannou et al. |
| 7,113,848 B2 | 9/2006 | Hanson |
| 7,310,571 B2 | 12/2007 | Kumazawa et al. |
| 7,718,105 B2 | 5/2010 | Tye et al. |
| 2,956,313 A1 | 1/2011 | Coleman |
| 7,887,729 B2 * | 2/2011 | Tye et al. ............ 264/219 |
| 2003/0066949 A1 * | 4/2003 | Mueller et al. ......... 250/208.1 |
| 2003/0110540 A1 | 6/2003 | Fukui et al. |
| 2007/0038331 A1 * | 2/2007 | Hanson ................ 700/245 |
| 2009/0289391 A1 * | 11/2009 | Tye et al. ............ 264/219 |

* cited by examiner

*Primary Examiner* — Jeremiah Smith
(74) *Attorney, Agent, or Firm* — Marsh Fischmann & Breyfogle LLP; Kent A. Lembke

(57) ABSTRACT

A method for fabricating a product, such as an animatronic character, with artificial skin. The method includes providing data defining an exterior surface geometry of the product. A base geometry model of the product is generated based on the exterior surface geometry data, which in turn is used to fabricate a prototype of the product. Then, an exterior skin mold is formed using the product prototype mounted on an alignment block. The method includes fabricating an inner support structure based on the base geometry model having an exterior geometry smaller than the 3D base geometry model by the thickness of the exterior skin. The inner support structure is positioned within the mold with the inner support structure mounted upon the alignment block, which is received in the mold. The product is formed by pouring material for an exterior skin layer into the mold and over the inner support structure.

15 Claims, 20 Drawing Sheets

MODELING SKIN-COVERED ROBOTICS DEVICES INCLUDING ARTISTIC DIGITAL ITERATIVE DESIGN PROCESSES

RELATED APPLICATIONS

This application is a continuation-in-part of U.S. patent application Ser. No. 12/781,375, filed May 17, 2010 and entitled "FABRICATING MULTI-COMPONENT SKIN SYSTEMS FOR ROBOTICS AND OTHER APPLICATIONS," which is a continuation of U.S. patent application Ser. No. 12/124,567, filed May 21, 2008, now U.S. Pat. No. 7,718,105, both of which are hereby incorporated in their entirety by reference.

BACKGROUND

1. Field of the Description

The present description relates, in general, to creating realistic skin for robots or for use with robotics or other applications in which skin or similar coverings are applied (e.g., robotics used to simulate movement of a human's or a character's face, hands, or the like), and, more particularly, to methods of designing and fabricating skin assemblies such as skin for applying over robotics where such methods are more efficient and repeatable (e.g., are not as reliant upon artist or craftsman time and talents).

2. Relevant Background

Durable materials that are often also flexible and elastic such as plastics and rubbers are used in many applications to create coverings or skins that are applied over an internal physical support structure or skeleton. For example, skins or skin systems are used to create realistic models of humans, animals, and characters, and when combined with robotics, such models may accurately simulate live beings.

Robotics involves the design and use of robots such as to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like. While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or more fanciful covering system such as a metallic suit or any other desired covering.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The connection or anchoring points become apparent as the skin is pulled or pushed from behind. Additionally, the movement may be undesirably localized with movement only at the point of attachment, whereas a human face generally stretches and contracts more as a unit (or the movement is more widespread across the face), e.g., a human's skin around their nose and eyes may move when skin around the mouth moves while a typical robotic skin may only move near the connection point with the manipulating robotics. Efforts have been made to try to create a material for use as the skin for robotics, and especially for a facial skin for human-like robots, but most of these materials still only provide a layer of skin that has a tendency to move at the point of attachment.

Currently, a skin system for a robot is made using a manual process relying on skill and experience of the craftsperson creating the skin and requiring many man-hours to prototype and later fabricate based on the prototype. In the existing process, a sculpture is created, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin, and this core may be configured to include skin attachment points to allow robotics to later be attached or anchored to the skin. A fiberglass or similar material is used to form a mold from this core, and hard shells, e.g., fiberglass shells to support the skin when the robot is later assembled, are then created from this core mold. An exterior skin can finally be formed by pouring a rubber or other flexible material into the gap between the exterior mold (with the sheet wax removed) and the core mold. After it is set, the skin is removed from the molds and placed on the supporting or hard shell(s) and attached to portions of the robotics.

Skin fabrication has been a cumbersome process and animation (or transfer of mechanical forces applied by the robotics) has often not met the needs of the robotics industry as the unitary skin reacts to the attached robotics in undesirable ways, which may include exposing the underlying robotics, moving only or mainly at the attachment point, and providing limited durability of skin at mounting or contact locations with the robotics. The skin typically is of a single material with one set of physical characteristics such as hardness, flexibility, and the like. Hence, there remains a need for improved methods for fabricating skin systems or assemblies for robotics and other applications that involve covering a support structure with a covering or skin. Preferably such fabrication methods would be less labor-intensive, would support use of multi-layers or components in the skin assembly, and would support design and prototype efforts such as more efficient alteration of component shapes, sizes, materials, and the like.

SUMMARY OF THE INVENTION

The present invention addresses the above problems by providing a method of fabricating an artificial skin system (e.g., an artificial texturing or covering system). In some embodiments, the skin system may be formed from two or more layers or components, and, in some of these embodiments, these components may be formed of a differing material or composition of the same material (e.g., an elastomer) to provide differing hardnesses or other desired physical characteristics for the various skin system components. Generally, the fabrication method includes scanning the object to be fabricated (e.g., a person's head, a character's head and/or body, a component of a product such as a portion of a vehicle, piece of furniture, or the like) and storing this information regarding the object's surface geometry. The method may then use computer modeling (e.g., 3D modeling such as modeling based on computer aided design (CAD) programs or the like) that processes the scanned surface geometry information to create a 3D model of the exterior skin of the object.

The use of a 3D model for the exterior skin (e.g., a modeled sculpture of a face or the like) facilitates later steps including creating a hard shell and various skin system components. Modeling may be used to model drive mechanisms (e.g., robotics) for the skin system components and for interior support components (e.g., inner layers of a skin system of the same or differing hardness). The method further includes fabricating structural or mechanical parts and/or molds such as by using rapid prototyping techniques that utilize data from the 3D modeling steps. Such molds may be used to form interior support components. A skin system can then be quickly and accurately made by pouring the exterior skin layer around and over the rapid prototype core mold and any other previously-formed interior components (such as drive devices and other skin support components with some or all of these components being formed of differing materials or having differing physical characteristics such as differing hardness relative to the exterior skin layer material). A single, integrally-bonded skin system or assembly is thus produced using a single final pour in place of prior practices using multiple molds.

The skin systems described herein are particularly well suited for use as skin for use with robotics such as that may be used to produce a robot head with realistic facial movement or animation but may, of course, be used in nearly any application in which a skin or covering is placed over a rigid or dynamic/movable support structure, frame, or the like. The skin systems are formed according to some embodiments of the fabrication method to produce a single, integral unit in which the components are bonded to each other to move together when manipulated by the attached or contacting robotics. To provide one specific (but not limiting) example, this description describes a skin system that may be used with a robotic head, and this example is provided because with an understanding of such a system those skilled in the art will readily understand many more and less complicated applications of skin systems that may be fabricated using the techniques described herein.

A skin system for a robotic head (or other robotics configuration) may include a flexible mechanism insertion section (i.e., an interior skin component) that transmits and distributes forces from a robotic mechanism. The forces or movement are transmitted to an adjacent backing member or component (i.e., another interior skin component) and to an overlying exterior layer or component (e.g., the outer visible skin layer that may be computer modeled with facial features of a modeled character that has been scanned). In some embodiments, the flexible mechanism insertion section is harder than the flexible exterior layer to cause the exterior skin to move in a desired manner (e.g., more realistically relative to a natural creature) such as in a less mechanical manner while also making the section that contacts the robotics more durable.

The soft flexible backing component in such embodiments may be used to support a substantial portion of the exterior skin and more uniformly distribute forces and stresses that occur during movement of the flexible mechanism insertion section, which may be surrounded by the backing component (e.g., the insertion section may be used to simulate a mouth of a creature while the backing is used to simulate the lower layers of skin, muscle, and the like under the exterior layer). The backing component is formed in some embodiments of a material that may be considered too soft and elastic to be used as the exterior skin but is effective and durable when encapsulated between the flexible exterior skin and a rigid supporting shell that is used to support and house the robotics. The backing component may be attached to the flexible mechanism insertion section such as with adhesive.

A unitary skin system is formed by pouring the exterior skin layer or component over the other skin system components (e.g., pouring a fluid resin of elastomer material (or filling/placing a material) such as silicone into a mold containing the rigid shell, the attached soft backing component, and the insertion section bonded to the backing component). The fabrication method described allows the exterior skin layer to be quickly modeled and, in some cases, a two-step molding technique is used to provide a "rough" casting that can be refined by an artisan to create a final exterior mold (e.g., by adding features not accurately provided by scanning and 3D computer modeling to create the "rough" or initial exterior mold). The fabrication method facilitates additional prototyping and altering of the interior components as these can be sized and shaped and modified to suit the modeled exterior skin layer (e.g., the exterior and interior dimensions of this layer are stored in memory with the data defining the exterior skin layer model). Further, each of these interior components (which may include driving robotics and/or structural features) has its defining data including shape, dimensions, and materials stored in memory for use in additional, modeling/design efforts.

More particularly, a method is provided for fabricating a product, such as a robot head, with an artificial skin system. The method includes providing in memory a set of digital data that defines an exterior surface geometry of the product and a model of an alignment block. The method also includes using a modeling tool (e.g., a 3D CAD-based application) running on a computer to generate a 3D base or core geometry model of the product based on the exterior surface geometry data set. Typically, the 3D base geometry model is configured for mounting on the model of the alignment block, and the method continues with creating a prototype of a product based on the 3D base geometry model. Then, an exterior skin mold is formed using the product prototype mounted on the alignment block. The method includes fabricating an inner support structure based on the 3D base geometry model, with the inner support structure having an exterior geometry selected to be smaller than the 3D base geometry model by an offset distance (which is selected to define the thickness of the exterior skin layer). The inner support structure is positioned within the exterior skin mold such that the inner support structure is mounted upon the alignment block and the alignment block is received in a matching recess in the exterior skin mold. The product is formed by pouring material such as a liquid elastomer for an exterior skin layer into the mold to flow about the inner support structure.

According to some aspects, the method may include providing the exterior surface geometry data set by performing a laser scanning of exterior surfaces of the product and, if necessary, processing the resulting cloud data set. The method may include forming the exterior skin mold by first forming an initial mold using the product prototype, creating a sculpt assembly in the initial mold, modifying the sculpt assembly by sculpting to add or alter features, and then second forming of the exterior skin mold (or final mold) using the modified sculpt assembly. Further, the fabricating of the inner support structure may include modeling, with the 3D modeling tool or the like, a structural shell with an exterior shape at least partially matching the 3D base geometry but accounting for the offset distance. The structural shell includes an outer wall that defines an interior void space. Fabricating of the inner support structure may include designing, again with the 3D modeling tool or other devices, at least one inner skin component positioned in an opening in the outer wall of the structural shell (but in some cases two or more inner skin components are provided). Then, the inner skin component is made from a material that will later bond with the material of the exterior skin layer during or after the pouring of the exterior skin. The method may include creating a model of a mold for the inner skin component with the modeling tool, and the mold and the structural shell may be manufactured by providing the mold model and structural shell model to a rapid prototype machine that is then operated to fabricate the inner skin component mold and the structural shell. Additionally, the method may include providing a drive mechanism or robotics configured for mating with the inner skin component and for positioning in the void space of the structural shell (e.g., by designing all or portions of these components based on the other modeled/designed inner support structure components). The fabricating of the inner support structure may include bonding the inner skin component to the structural shell, and, in some embodiments, the material of the inner skin component is harder than the material of the exterior skin layer after it sets/solidifies, so as to provide a force receiving component in the inner support structure. The pouring of the exterior skin layer may include providing a volume of a fluid elastomer that flows within a cavity of the exterior skin mold over the force receiving component, with an inner surface of the exterior skin component becoming integrally bonded to the force receiving component as the fluid elastomer solidifies.

According to another aspect of the description, a method is provided for fabricating a product with an artificial skin system. The method includes forming an exterior skin mold using a product prototype mounted on an alignment block, and, in some cases, a recess matching the alignment block is formed in the exterior skin mold. The method includes scanning the product prototype on the alignment block and, with a modeling tool run by a processor of a computer, generating, based on data from the scanning of the product prototype, a three dimensional (3D) digital model of a mold core on a digital model of the alignment block. The method further includes fabricating a core based on the 3D digital model of the mold core. Then, the method includes positioning the fabricated core within the exterior skin mold. In some cases, the fabricated core is mounted upon the alignment block and the alignment block is received in the matching recess in the exterior skin mold to align the inner support structure with the exterior skin mold. The method continues with filling a cavity between an exterior surface of the fabricated core and the exterior skin mold with an elastomeric material to form a skin.

In some embodiments of the method, the exterior surface of the fabricated core comprises a plurality of mounting elements and the method includes prior to the filling step, placing an elastomeric actuation piece (EAP) on each of the mounting elements. In some cases, the method further includes, with the modeling tool, generating, based on the data from the scanning, a 3D model of the skin including the EAPs between an inner surface and an exterior surface. In such embodiments, the EAPs may include a number of skin-locking EAPs and a number of load-spreading EAPs, the load-spreading EAPs each being adapted for mating with a driver of a robotic mechanism. Additionally, the method may include, with the modeling tool, generating a 3D model of an assembly of the robotic mechanisms including 3D locations of connection points of the drivers with the load-spreading EAPs and including an outer shell with mounting elements for the skin-locking EAPs and connection openings for the drivers providing a passageway for the drivers to connect with the load-spreading EAPs. In these cases, the method may also include, with the modeling tool, moving one of the EAPs to a different 3D location within the model of the skin in response to user input and, in response, updating the model of the skin and the 3D digital model of the core. In some cases, the method may also include, with the modeling tool, adding an additional load-spreading EAP to the model of the skin in response to user input and, in response, updating a digital model of a robotics assembly to include a driver for the additional load-spreading EAP.

DETAILED DESCRIPTION OF THE PREFERRED EMBODIMENTS

Figure 1:
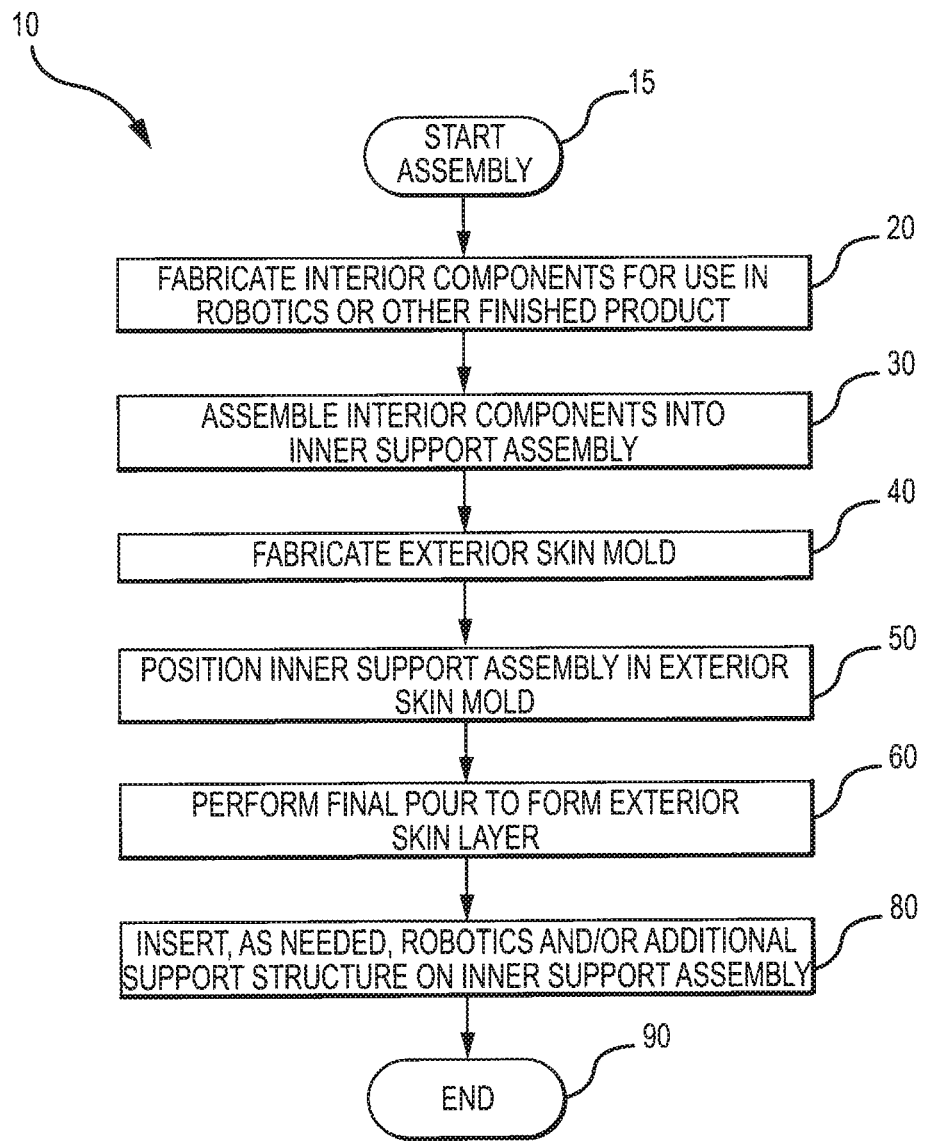
FIG. 1 is a flow diagram for a process or method of assembling a product, such as a robotic character, having an exterior skin layer and interior skin or other components.

Briefly, embodiments of the present invention are directed to fabrication methods for products or items that include skin systems (e.g., robots or other structures/assemblies that incorporate skin systems) for providing extremely realistic looking facial movement or animation or providing a desired covering of an internal structure and/or moving parts. The following description highlights the use of the assembly and fabrication methods with robotics-based products and devices and, particularly, a robotic head, but the concepts described are readily extended to other applications in which an internal structure or support is covered with a skin or covering. The following discussion begins with a general overview of one useful skin system and then proceeds to a discussion of a general assembly method for a product or apparatus using such a skin system. The resulting product and its components (e.g., a unitary exterior skin layer, multiple interior skin components, rigid structural components, and robotics or driving mechanisms) are then described in more detail. A discussion is then provided of a fabrication technique that can be used to implement an embodiment of the invention providing details of how the assembly of the product with the skin system can be created and designed/prototyped.

In some embodiments, a skin system is provided that is durable and easily maintained and that is designed to simulate a head and face of a robot such as a human face, a character face (e.g., a puppet face, an animated creature face, or the like), a creature face, or the like. The skin system is typically fabricated from two or more flexible components with differing physical characteristics such as two or more components or layers formed from the same or differing materials but having two or more hardnesses to achieve a desired effect. The following description highlights the use of such a skin system with robotic assemblies, but the skin system is also useful in other applications in which it is desirable to cover a still/rigid or a dynamic/movable frame, support structure/skeleton, or other object with a skin system having more than one hardness (or more than one durability/flexibility). Such other applications are considered within the breadth of the following description and claims.

For example, the inner support structure or assembly may include a component as part of an overall skin system for receiving mechanical forces (e.g., a force receiving component) or this component may be thought of as the anchor component or the manipulated component as it typically is adapted for mating with driving or manipulation members of a robotics system (e.g., mouth driving mechanism of robotics system may be attached to this member). Since this component needs to resist wear and transfer forces, it may be formed of a flexible material with a relatively high hardness value. Other components in the skin system contact this force receiving component such as an intermediate support component or backing and an overlying or exterior component or layer that extends over all other components (e.g., the exterior skin layer). These components may be formed of a flexible material but with a relatively low hardness. The overlying or exterior skin layer may further act to bond all the components of the skin system together into a single unit.

In the assembled product or apparatus (e.g., the robotic character), the skin system may be supported by structural members including an inner shell or frame formed of rigid materials (such as plastic or fiberglass) to simulate rigid support found in nature such as a skull or other bone. The robotics may be housed within this support shell and extend through the shell to engage the skin system, e.g., the force receiving component, to manipulate the skin system to create desired animation such as facial expressions or speech. Use of multiple hardnesses for the joined skin components in the skin system can result in more realistic movement of the skin such as less obvious point source pushing and pulling where the robotics engage the skin system and such as skin distal to the contact points moving in unison (e.g., the skin system better simulates human and other skin in that it moves more as a unit rather than in small isolated patches where a force is being applied).

FIG. 1 illustrates an assembly process 10 for a robotic or other apparatus that includes a skin system. The method 10 starts at 15 such as by selecting an object to be a basis for creating the robotic apparatus such as by selecting a person, an animal, a character model, or the like. At the starting step 15, the robotic apparatus may also be designed including deciding whether the skin system will simply be a single exterior layer or whether it will include one or more inner structural components (such as a force receiving component and a soft backing component). The design typically will also include design of a rigid support structure and, when appropriate, design/selection of robotics or driving mechanisms. As will become clear, the design and prototyping of these components is greatly facilitated by the fabrication method of embodiments of the invention.

The assembly 10 continues at 20 with fabrication of the interior components (or inner support structure/assembly) for use in the robotics or other finished product. Again, this step 20 is facilitated by the fabrication techniques of the invention including 3D computer modeling of these components (which may be considered part of the designing of step 15) based on surface geometry information obtained by scanning the selected object or subject for modeling. Fabrication at 20 may include creation of molds using 3D computer modeling of the inner structural components and rapid prototyping techniques (e.g., molds printed using data stored in memory that define the modeled components). At 30, the formed interior components are pieced together to create the inner support structure or assembly. Step 30 may include assembling a rigid or flexible shell or frame and then placing inner skin system components upon receiving surfaces of the hard shell or frame.

At 40, the method 10 continues with fabrication of an exterior skin mold. As explained below, step 40 may be a two-part process in which a first or initial mold is created using the surface geometry of the subject model or base object (e.g., a person, an animal, a character, or the like). The surface geometry data may be obtained by electronic scanning of the subject model or base object and entering/importing this information to a design or modeling software program (such as a computer aided design (CAD)-based tool or the like). This initial exterior mold may be used to perform step 40 or, in other cases, an initial or "rough" shape is formed in this initial exterior mold, and the initial shape is modified manually, such as by a sculptor, an artisan, or worker, to add fine detail. Next, a final or second exterior skin mold is formed around the modified or detailed sculpture or shape.

At 50, the inner support assembly is positioned within the exterior skin mold (e.g., the final or second exterior skin mold). To facilitate accurate positioning, a location or alignment block may be mounted onto the initial/rough shape or modified/detailed shape or sculpture prior to forming the second exterior skin mold. This location block may be included in the design of the components of the inner support structure such that these components may be attached in proper arrangement or configuration upon this location or alignment block (e.g., by attaching the hard shell or frame to the block). At 60, the method 10 includes performing a final pour of material such as silicone or the like into the exterior skin mold to form the exterior skin layer. In some embodiments, the skin is formed over the inner support structure such that the skin layer is a unitary piece that may be viewed from nearly any angle without a seam or opening being visible. The thickness of the skin layer is defined by the space between an inner surface of the exterior skin mold and outer surfaces of the inner support structure (and, in some cases, this thickness is reduced by contraction or shrinking of the poured material as it hardens/sets).

At 80, the location block may be removed and robotics/drive mechanisms and/or additional support structure may be inserted into the inner support assembly. Step 80 may include attaching such inserted components to one or more portions of the inner support structure (e.g., to the force receiving component of the skin system, to the hard shell/frame, and the like). Note, the location block and inner skin system components and the hard shell/frame are fabricated without gaps, holes, or the like that may provide a flow path for the poured material of the exterior skin layer. Further, additional brackets that are permanent or temporary may be inserted into the shell or frame to provide support of softer components during the pour 60 (e.g., to better withstand pressures or forces applied by the poured material). The method 10 then ends at 90 with or without additional finishing steps and or mounting of the skinned product onto additional structure/supports (e.g., mounting a robotic head onto a body, a robotic hand onto an arm, or the like).

Figure 2:
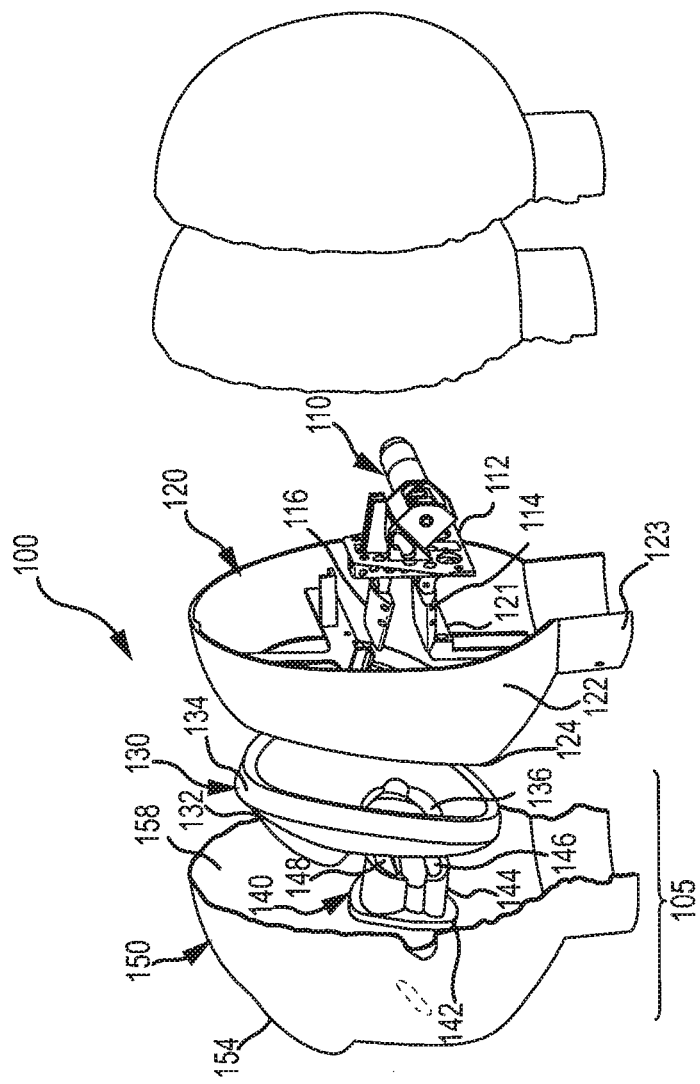
FIG. 2 is an exploded side view of a robot head (e.g., a product or apparatus that can be assembled with the method of FIG. 1) with a skin system according to an embodiment of the invention such as but not limited to a skin system with two or more flexible components that may have differing hardness.
Figure 3:
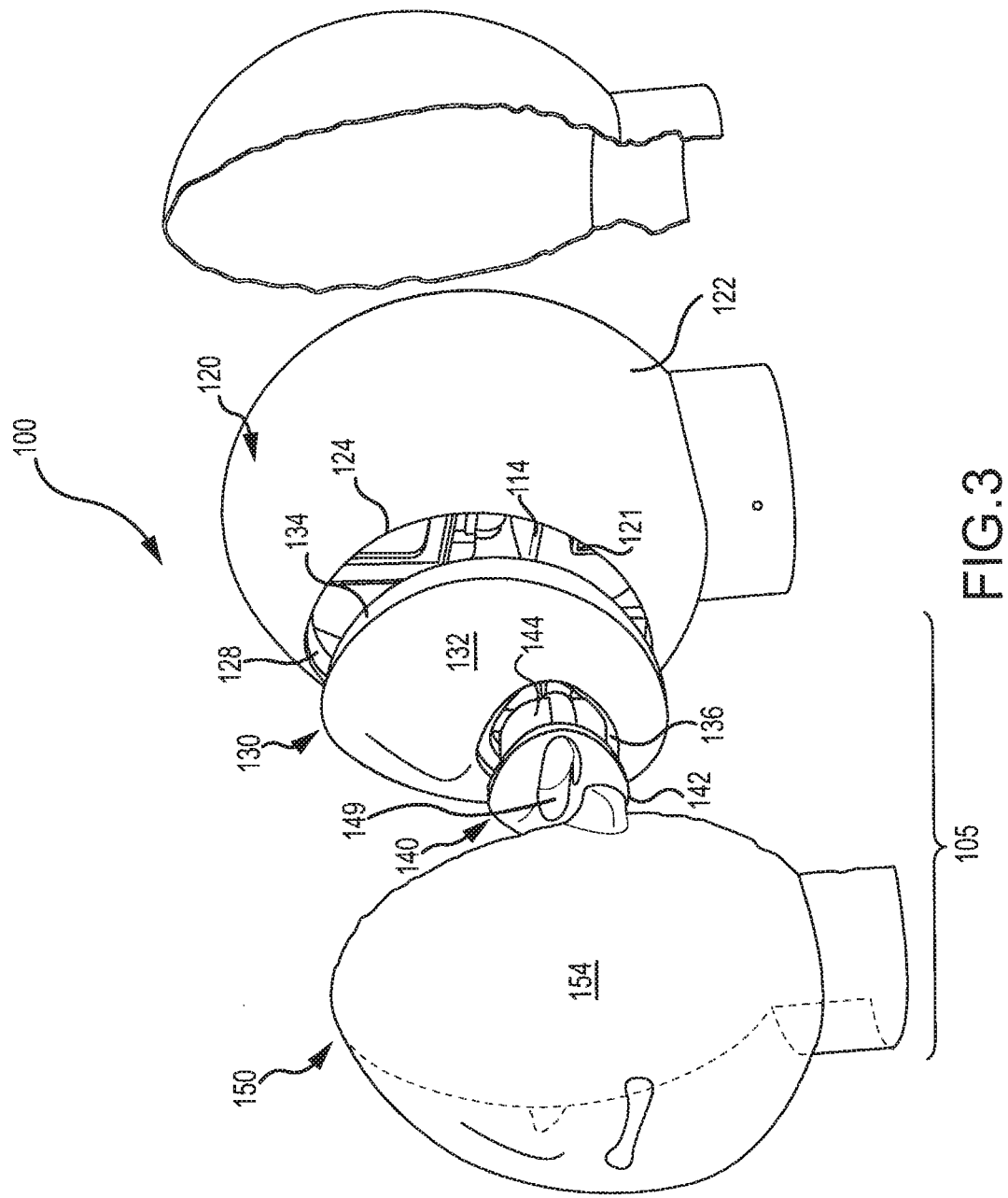
FIG. 3 illustrates a side view similar to that of FIG. 2 showing more detail of the mating of the flexible components of the skin system and placement within a receiving opening or surface of a supportive shell or frame.

FIGS. 2 and 3 illustrate an embodiment of a robot head or robotic system 100 (e.g., a "skinned" or assembled product or apparatus such as may be formed with the method 10 of FIG. 1) that includes a robotic assembly 110, a hard shell or structural support frame 120, and a skin system 105. The robotic assembly or robotics 110 is shown in simplified form and may include typical robotic software, hardware, and mechanical mechanisms and linkages used to perform programmed or controllable movements. In this regard, the robotics 110 includes a mounting plate 112 for attaching it to structural frame 120 upon mounting member 121. The robotics 110 in this example may be a mouth mechanism or a mechanism for simulating movements of a mouth, and, as such, includes manipulators or skin driving members 114, 116 (e.g., upper and lower jaw or roof of mouth and bottom of mouth simulating elements extending from driving devices in robotics 110). The particular arrangement and configuration of the robotics 110 is not limiting to the invention as the skin systems fabricated according to techniques of the invention, such as the method 10 of FIG. 1 or method 700 of FIG. 7, may be used with numerous robotics or other devices such as those that impart force to provide a desired response (or look and feel) or that simply provide a skin/cover over a structural assembly. As shown, the robotics 110 is enclosed in the shell 120, and, typically, the robotics 110 is inserted into the shell 120 before or, more typically, after the pouring of the exterior layer or component 150 of the skin system 105 (such as after removal of a location or alignment block shown as element 310 in FIG. 4).

A hard shell or support frame 120 is included in the robot head 100 to provide the structure of the head and to provide physical support for the soft skin system 105 and to contain and hide the robotics 110. The hard shell 120 is rigid and is typically formed of a material such as a plastic (such as a polycarbonate/ABS mix or the like) but metals and/or alloys may also be used to form shell 120. The shell 120 includes a sidewall 122 generally in the shape of the head (or skull) of the creature being simulated by robot head 100, with the head 100 being a relatively generic character such as may be used to imitate a puppet or character such as for use in an amusement park. The sidewall 122 extends down into a neck portion 123 of the shell 120, with the neck portion 123 having an opening for receiving and mounting to an alignment or location block (shown as 310 in FIG. 4). The shell 120 functions to support the skin system 105, and, in this regard, the sidewall 122 includes an opening 124 for receiving a component 130 of the skin system 105. Specifically, a receiving surface 128 extends from the sidewall 122 at the gap or opening 124 to receive the component 130, and this surface 128 may be tapered to guide the component 130 into the shell 120 but block or limit travel (e.g., to cause the component 130 to be substantially flush with the outer surface of the sidewall 122). Component 130 may also be bonded to shell 120 at surfaces 128 and 134 to seal cracks or seams that may allow later poured material such as liquid silicone to leak through to the interior of the shell 120. Prior to pouring of exterior skin layer 150 additional support brackets may also be provided within shell 120 so as to support the backing component 130 and/or force-receiving component 140 from pressures or forces that may deform or push in these components.

The skin system 105 includes two or more portions or layers that have differing hardness but this will not be the case in all skin systems formed using the inventive fabrication methods described herein. These portions may be formed from the same or differing materials and, in some embodiments, are bonded together to move as if formed as an integral part. As shown, the skin assembly 105 is formed from three components 130, 140, 150, but, in other cases, fewer or more components may be utilized. Further, all of the components may have differing hardness values or some of the parts may have the same or similar hardness values with the important aspect being that at least two of the components have different hardness values.

In the illustrated example, the skin system 105 includes three components or layers 130, 140, 150. The first component is a soft, flexible backing component or layer 130. The soft flexible backing component 130 is used in the robot head 100 as a thick, soft layer that is positioned behind the exterior component or layer 150, which is formed with details (such as facial details to simulate a particular character, human, or creature) to provide the head 100 with a desired external or visible appearance. The backing component 130 may be the softest portion of the skin system 105, but this is not required as some configurations may be arranged differently such as with the backing being one of the harder portions. In some cases, though, the use of a backing component 130 that is relatively soft provides a more desirable effect because its softness allows it to be effective to support the exterior component or layer 150 while also allowing it to move relatively easily with adjacent components such as component 140, which is attached to the robotics 110 via members 114, 116.

For example, if the robot head 100 is being used to imitate a puppet with a soft foam head it may be useful for the whole face to move when the mouth moves, and this is achieved in the head 100 because the soft backing component 130 moves relatively freely with the force receiving component 140 (or the mouth). This causes the supported portions of the exterior component (or the detailed "face" of the robot 100) to also move because, in part, the component 150 is bonded to the outer surface 132 of component 130 as explained below (e.g., due to pouring or forming the exterior component 150 upon the component 130).

The soft flexible backing 130 may be created with a mold (e.g., a mold that is modeled based on scanned/determined surface geometry of skin 150 and fabricated using rapid prototype machines or other techniques) and pouring a variety of materials into that mold to form its shape or casting the part. The poured materials are generally elastic materials, but this is not required to practice the invention as it may be useful to provide a more rigid component with one or more components that are rigid. However, typically the components of the skin system 105 will be elastic and flexible to allow manipulation by robotics 110. The materials used for the components 130, 140, 150 are chosen to be compatible to bonding such as bonding of component 130 to 140 with adhesive and then bonding of components 130 and 140 to component 150 during the molding and pouring processes. The materials may be the same or differ for the components 130, 140, 150, with some embodiments choosing the same material but differing hardnesses for the three components 130, 140, 150. The material may be a plastic or, more typically a polyurethane or rubber. In some embodiments, the component 130 is formed of silicone such as a silicone foam or a silicone foam with additives such as a silicone and urethane foam. As noted above, the backing component 130 is typically bonded to shell 120 about its periphery such as at surfaces 128 and 134 with adhesive or the like such that when the outer layer or component 150 is formed through pouring liquid does not seep into the interior of the shell 120.

As discussed, it may be desirable to have the components have differing hardnesses to achieve desired wear and desired movements. Hardness herein is intended to relate in part to flexibility or level of elasticity with components 130, 140, 150 having a higher value of hardness being less elastic (and vice versa). Hardness is generally the resistance of a material to localized deformation and may apply to deformation from indentation, scratching, cutting, or bending. For elastomers, rubbers, and some polymers (that may be used for components in skin system 105), hardness may be thought of as the resistance to elastic deformation of the surface. In one embodiment, component 130 is chosen to be have the lowest hardness value of the three components 130, 140, 150 of system 105 and may have a hardness on a "00" scale as measured with a durometer that is less then about 40 with some embodiments using silicone, urethane, or the like that has a hardness on a "00" scale measured with a durometer in the range of about 1 to 25 (such as about 20 which is softer or more susceptible to elastic deformation than the rubber in a typical rubber band and some cases using a hardness of 5 or less on the "00" scale such as a hardness of about 3). The fabrication techniques described herein allow more efficient fabrication of the inner components such as 130, 140 as well as the exterior layer 150 such that it is more efficient to try or to prototype various materials and/or hardnesses (or other physical characteristics) as new molds can be quickly printed or formed to test skin system or shell configurations.

The component 130 includes a mating surface 134, which may be beveled as shown, that abuts or contacts the receiving surface 128 of the shell sidewall 122. As shown, the softer backing component 130 acts as the interacting portion of the skin system 105 with the shell 120, but this is not required to practice the invention (e.g., a harder component such as component 140 may abut the shell 120). The component 130 acts as a backing or support for the exterior component or shell 150, and, as such, it may be configured with a face or outer surface 132 that has similar contours and/or topography as the layer 150. In this way, the facing surface 132 may better support shaped surfaces of the layer 150 such as the nose shown on facing surface 132 and exterior surface 154 of layer 150. Also, as shown, the component 130 includes a gap or hole 136 for receiving and mating with the component 140, but, in some embodiments, the component 130 may not encircle the component 140 (e.g., may simply be placed adjacent an edge of the component 140). In the illustrated case, the component 140 is acting as the mouth of the head 100 and component 130 is acting as lower surfaces or layers of a face (e.g., the muscles, tendons, bones, and the like under the face adjacent the mouth), and, in this case, it is desirable to have the soft component 130 surround the sides of component 140 so as to have the surrounding portion of the face move with the mouth of the robot head 100.

Component 140 of the skin system 105 is typically the hardest component as it functions to receive the manipulators 114, 116 of the robotics 110. In other words, the component 140 is the force receiving/transmitting portion of the skin system 105 and preferably has a higher hardness value to have better wear characteristics and also to more effectively transfer the transmitted movement from the robotics 110 with less absorption of this force as would be the case with a very elastic or soft material (e.g., the component 130). In other embodiments, several portions of the skin system 105 may be provided to contact and interact with the robotics 110 (e.g., a plurality of anchor locations for the robotics) such as may be provided on a face at or near eyebrows or other locations to simulate separate facial muscles. The illustrated force-receiving component 140 includes a front wall 142 that abuts and supports a portion of the exterior layer or component 150 (e.g., the lips in this case) and a receiver portion 144 with channels 146, 148 for receiving manipulators 114, 116.

During operation of the head 100, the robotics 110 move in a programmed or controllable manner that, in turn, causes the component 140 to move, and, particularly, a gap or void space 149 is provided to facilitate movement of the receiver 144 to open and close the void space 149 (e.g., to open and close the mouth of the head 100). Of course, the gap 149 is not required to practice the invention and its inclusion and shape, size, and other features may be varied to practice the invention (e.g., to suit the desired action and appearance of the head 100 and the exterior layer 150 and its features). Note, though, that recessed surfaces in the components 130 and 140 act to receive poured liquid material used to form the exterior component 150 and assist in shaping the component 150 and also providing bonding sites between the components with depth which may provide better/stronger bonding.

Again, the component 140 may be made of the same material as the component 130 or of a differing material such as the elastic materials listed earlier. Typically, it is preferable that the materials used be selected to bond to the exterior component 150 when it is formed to provide a bond that generally extends over the entire exposed surfaces (e.g., over facing element 142, into void 149, and over outer or face surface 132) of these components 130, 140 upon formation of component 150 (e.g., during a "final" pour step). The flexible mechanism insertion section or component 140 is used to transfer mouth mechanism 110 movements smoothly to the face 150 (and component 130). It is also preferably selected to have an elasticity and toughness that makes it durable enough to withstand the repetitive movement of the mechanism or robotics 110 while being soft enough to maintain or provide a realistic action and/or look when it moves with the robotics 110. As with component 130, component 140 may be made using any of a number of well-known methods such as making a mold of the desired shape to allow pouring to cast or produce the component 140. The material may be chosen from those listed for the component 130 such as a silicone, a urethane, a rubber, or even some plastics. The hardness of the component 140, though, is typically greater than the adjoining component 130, and in some embodiments, it has a hardness between 30 to 90 as measured by a durometer on the "00" scale or a greater hardness. In one embodiment, the hardness of the component 140 is in the range of 40 to 60 on the "00" scale (e.g., about 40 to 45 measured hardness) with a value of between 45 to 55 being useful in some cases (e.g., about 48 was used in one implementation of skin system 105). Again, these hardness values are only provided for reference and are not limiting of the invention and skin system fabrication techniques.

Figure 6:
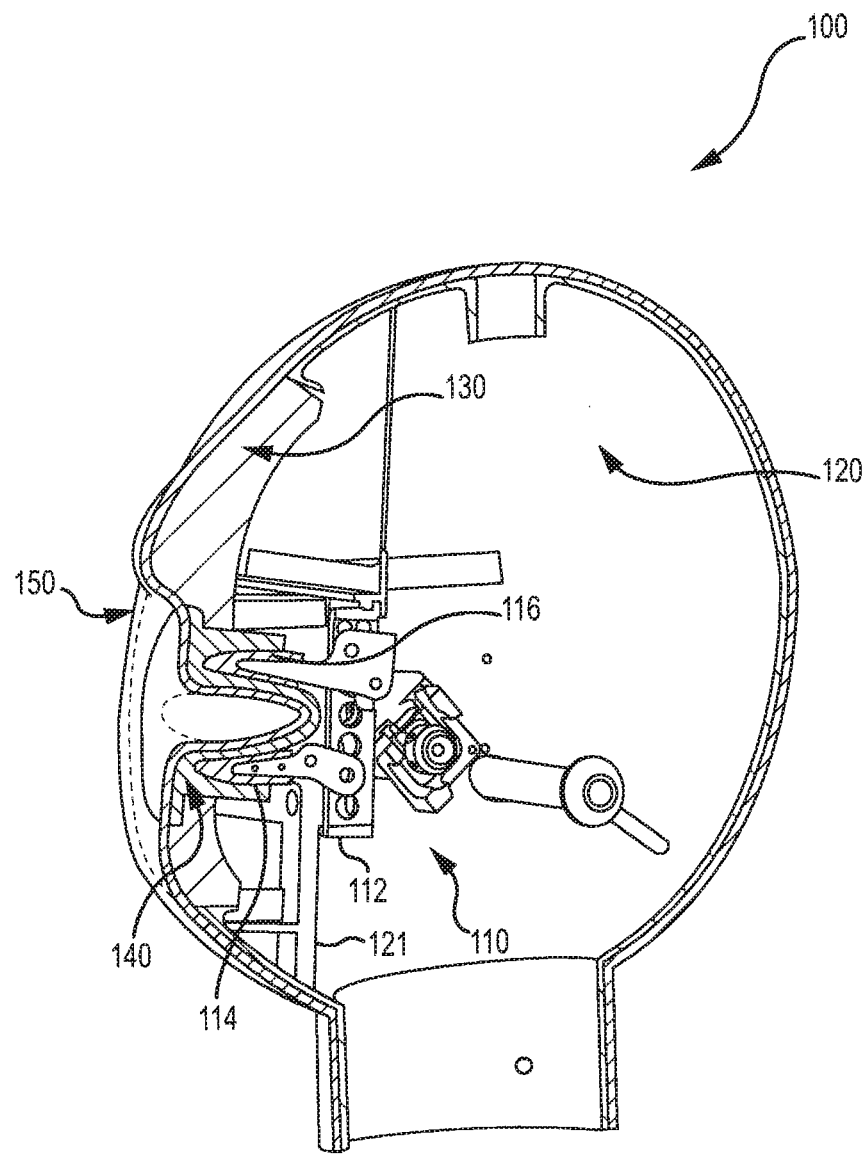
FIG. 6 illustrates the head of FIG. 2 with a cross sectional view showing the various layers of the skin system after assembly (e.g., after the robotics or drive mechanisms are inserted into the inner shell or frame with the manipulators or drive elements of a mouth mechanism or robotics assembly inserted into or attached to the force transfer component or layer of the skin system)

In the skin system 105 of FIGS. 2 and 6, an exterior layer or component 150 is provided that functions as the exterior skin layer of the head 100 (e.g., the portion that is visible to observers). The exterior layer 150 may be formed last by pouring or forming over the other components 130, 140 of the skin system 105 as well as the shell 120 when these components that provide in inner support structure or assembly are placed in an exterior skin mold (such as with location block 310 attached to the walls of the mold to center or position the inner support structure components relative to the inner surfaces of the exterior skin mold walls). The exterior component 150 includes an outer surface 154 that provides, in the head example, facial features of the robot head 100 such as lips, a nose, ears, and the like, and these features or details of such features may be added or refined manually by an artisan manipulating or sculpting on a shape or formable object (such as clay) formed in a first or initial mold (e.g., a mold created from a core geometry modeled based on surface geometry data obtained by scanning a base or subject object).

The component 150 also includes an inner surface 158 that contacts and bonds at least to the other skin components 130, 140 and, in some embodiments, to the shell 120 (although bonding to the shell 120 is not required to practice the invention as the layer 150 typically extends about the entire shell 120 and connection only in the front or face portion is acceptable in many applications). The exterior component or layer 150 has a thickness that typically will be relatively small such as less than 0.25 inches and more typically less than about 0.125 inches, but it may have a range of thickness to provide topology or features (such as ears, lips, and the like). In thinner portions or regions, the layer 150 relies upon the backing 130 and component 140, at least in part, to support and/or provide its shape.

The exterior layer 150 is typically fabricated by a final pour after assembly of the other components of the head 100 (e.g., of the inner support structure or assembly). This technique of pouring the skin or exterior layer 150 last allows the details of an original sculpt (that is used to create an exterior mold) to be picked up or created in the layer 150. For example, a molding process may be followed in which fluid resin (e.g., a thermosetting, thermosetting, thermoplastic, or other resin with additives provided to cause the resin to solidify) is poured into a mold or frame into which other skin components 130 and 140 have been placed. Concurrently, the pouring of the skin layer 150 causes the skin system 105 to become intrinsically bonded together (such as a crosslink or other bond between the materials of the differing components) such that the three components 130, 140, and 150 as well as shell 120 (which may be attached to the periphery of component 130) are attached to each other to behave as an integral unit or system (e.g., the layer 150 is bonded to the component 130 and also to the component 140 during the final mold process).

Figure 5:
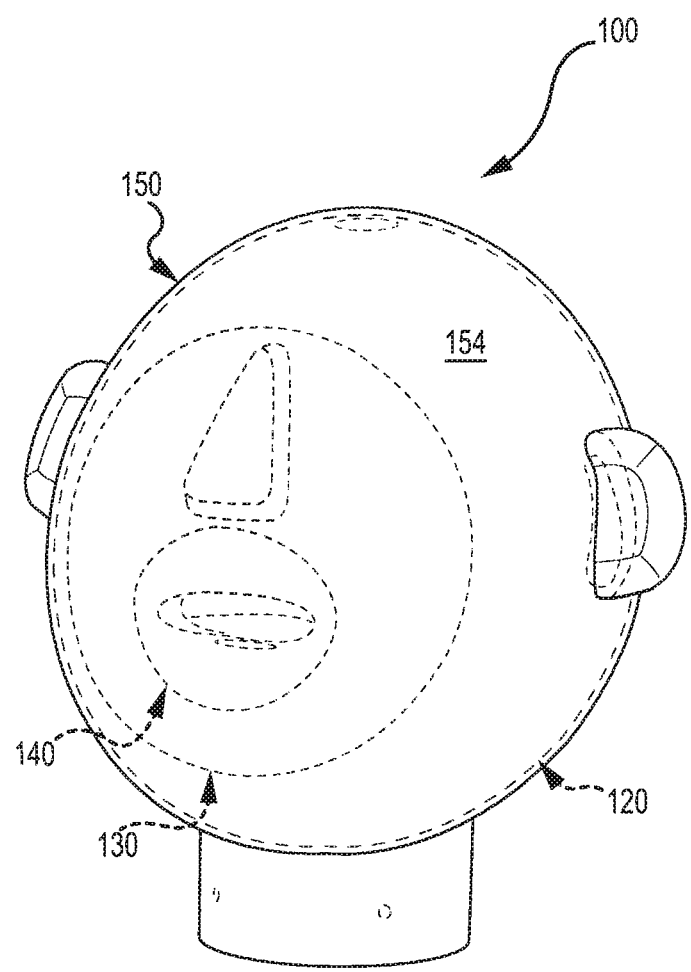
FIG. 5 is a perspective view of the robot assembly of FIG. 4 after application of the exterior component or layer of the skin system.

The layer 150 may be formed of any of the elastic materials discussed thus far and may be the same or a different material as one or both of the components 130, 140. In one embodiment, the exterior skin layer 150 is chosen to have a desired color and/or texture (e.g., of the character or being that is simulated by head 100) and may be formed of silicone or another elastic material such as rubber, urethane, plastic, or the like. The hardness is typically chosen to be less than the force transmitting component 140 but greater than the soft and very elastic backing component 130. For example, the exterior skin layer 150 may have hardness value of less than about 50 on the "00" scale when tested with a durometer or more typically less than about 40 (such as between 30 and 40 with a hardness of about 36 used for the skin layer 150 in one implementation of a puppet head 100 and a hardness of about 30 to 32 used in another case). In one embodiment, a backing plate and/or brackets (not shown in FIG. 6) were provided within the interior of the shell 120 during the pouring/formation of layer 150 to support the soft, flexible backing component 130. In this embodiment, the backing plate acts as support in the final pour of the component 150, e.g., pouring of silicone or the like. The mold builds up pressure from the poured material of the component 150 as the silicone or other poured material is forced through the mold, and the backing plate keeps the component 130 from collapsing inward (e.g., generally in its final position as shown in FIGS. 5 and 6). Other backing structures may optionally be used to practice the invention. In the fabrication of one embodiment of the product, the inventors discovered the desirability for structures to support components, such as component 130, during the filling process. The soft flexible hacking and the three-receiving component, for example, that are bonded to the hard shell are flexible, and they may not have enough strength to hold their position during the final filling of the mold. To solve this problem, the inventors created and installed a removable structural or backing assembly. This assembly preferably can be disassembled and removed through the opening of the hard shell after the exterior layer has cured and can then be reused for subsequent parts or product fabrication.

In some skin system designs or skin systems fabricated according to the invention, two or more components have differing hardness (and, hence, elasticity and response to applied forces) within the integral skin system or assembly. In the example of FIGS. 2 and 3, three components 130, 140, 150, each having a differing hardness, are utilized in skin system 105. These components may be formed of differing materials, be formed using molds formed for that part or by other fabrication processes, and be supported with a hard, rigid shell 120 or used in an application without such support. Further, the assembly process may vary to provide the system 105 and a robot head or other higher-level assembly utilizing the skin 105, such as head 100 of FIGS. 2 and 3. However, the following description provides a useful assembly process that may be used to form skin system 105 and head 100.

Figure 4:
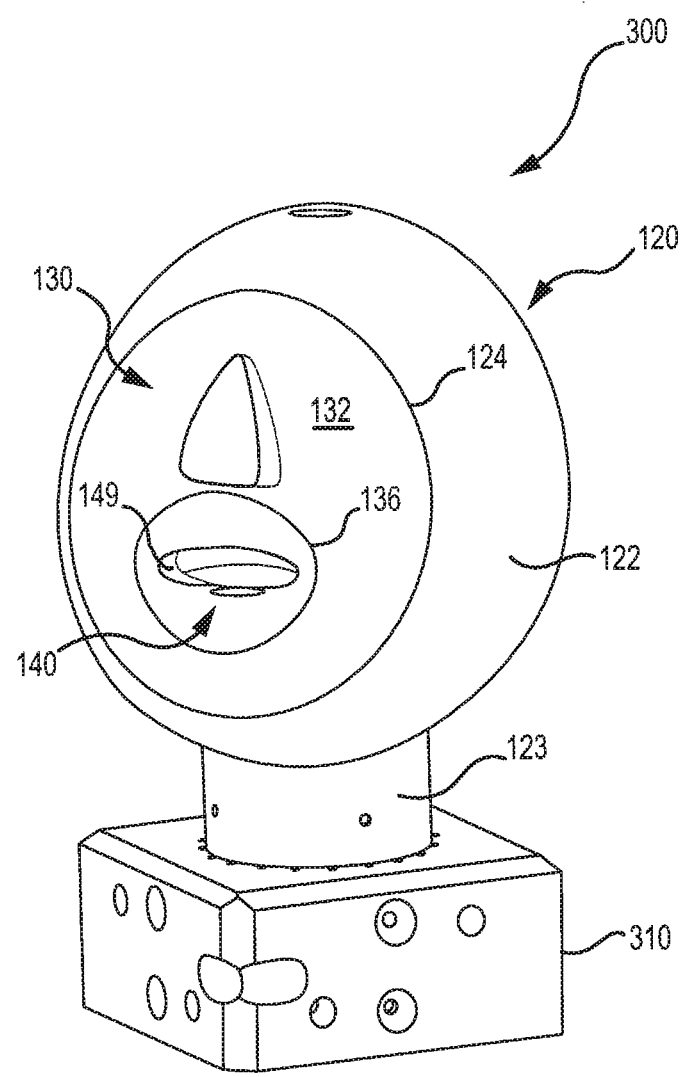
FIG. 4 is a perspective view of a robot head assembly during fabrication, e.g., prior to formation of the exterior component or layer of the skin system.

FIG. 4 illustrates a partial fabrication assembly 300 of the head 100. As shown, the hard shell 120, the soft backing component 130, and the force receiving/robotic interaction component 140 have been formed and are being assembled into assembly 300. The shell 120 may be attached at the neck section 123 to location block or mounting structure 310, which can function to physically support the assembly 300 during assembly and also to place the assembly 300 within a mold for pouring of the exterior layer or skin component 150. During assembly, the hard shell 120 is bonded to the soft flexible backing 130 using an adhesive to mate surface 134 to sidewall 122 receiving surface 128 (shown in FIGS. 2 and 3). Similarly, the backing component 130 is attached to the force-receiving component 140 (e.g., flexible mechanism insertion section) using an adhesive. The adhesive may be any sealant appropriate to substantially permanently attach the components together (e.g., such that one or both of the parts have to be destroyed or damaged to disassemble or some lesser bonding amount may be useful in some cases) and that is selected for the particular materials used for these components of the assembly 300. In this way, the components 130 and 140 are physically supported by the shell 120 and component 140 is able to move in response to robotics 110 while transmitting forces to soft backing component 130. In one embodiment, the adhesive is a sealant used with silicone (or molded liquid silicone rubber) such as an RTV silicone adhesive sealant (one part acetoxy cure silicones, oxime-cure silicones, or otherwise) distributed by Dow Corning such as their 732 Multi-Purpose Sealant or the like. Of course, other adhesives may be used such as a polyurethane adhesive, an epoxy-based adhesive, a rubber adhesive (pressure or the like), a cyanoacrylate, an acrylic (light cure, two-part, or the like), and/or other adhesives that function to affix or destructively bond the components 120, 130, and 140 together in assembly 300.

FIG. 5 illustrates a next step in the assembly process in which the robot head 100 is nearly complete. After forming the assembly 300, the bonded assembly 300 is inserted into an exterior skin mold fabricated for the head 100 and a final pour is performed to create the exterior layer 150 of skin assembly 105. The components 120, 130, 140 are created with dimensions slightly smaller than the adjacent surfaces of the mold (as defined or modeled by the 3D computer modeling process described below based on scanned surface geometry data) such that when the assembly 300 is positioned (e.g., by mounting with the block 310 to the mold walls) in the mold there is a gap all the way around the assembly 300 for the exterior skin pour (e.g., liquid silicone or other elastomer or elastic material with a desired hardness when cured or solidified), with the "gap" defining the thickness of the component 150. By pouring the exterior component over the bonded components 120, 130, 140 of assembly 300, the exterior layer or skin component 150 becomes bonded to the skin components 130, 140 to form an integral or unitary skin assembly 105 that moves together when manipulated by robotics 110. Particularly, the inner surface 158 of exterior component 150 is bonded to the outer or facing surface 132 of the backing component 130 and to the outer portion 142 of the robotics insertion component 140.

FIG. 6 illustrates the assembled robot head 100 after the pouring or formation of exterior layer 150 and insertion of robotics 110. As shown, the exterior layer 150 abuts and is bonded to the soft flexible backing component 130 as well as the flexible mechanism insertion component 140. The backing component 130 may be supported by a portion of the shell 120 as shown in this example but this is not required to practice the invention. The robotics 110 is mounted via mounting element 112 to hard shell 120 on frame 121. In this position, the manipulators 114, 116 are inserted into the component 140 of the skin system 105 after pouring of the exterior skin layer 150 such that the component 140 moves with the manipulators 114, 116, and such movement is transferred to the attached backing component 130 as well as the overlying and attached flexible exterior component 150. Again, the hardness ratings or values of the three components 130, 140, and 150 may be selected to achieve a desired effect for a particular implementation of the head 100. This may involve an amount of testing and modeling to achieve a preferred result, but typically the backing component 130 has the lowest hardness followed by the durable exterior component 150 and then the mechanism insertion or force receiving/transmitting component 140, which is the hardest component in the skin system 105.

Figure 7:
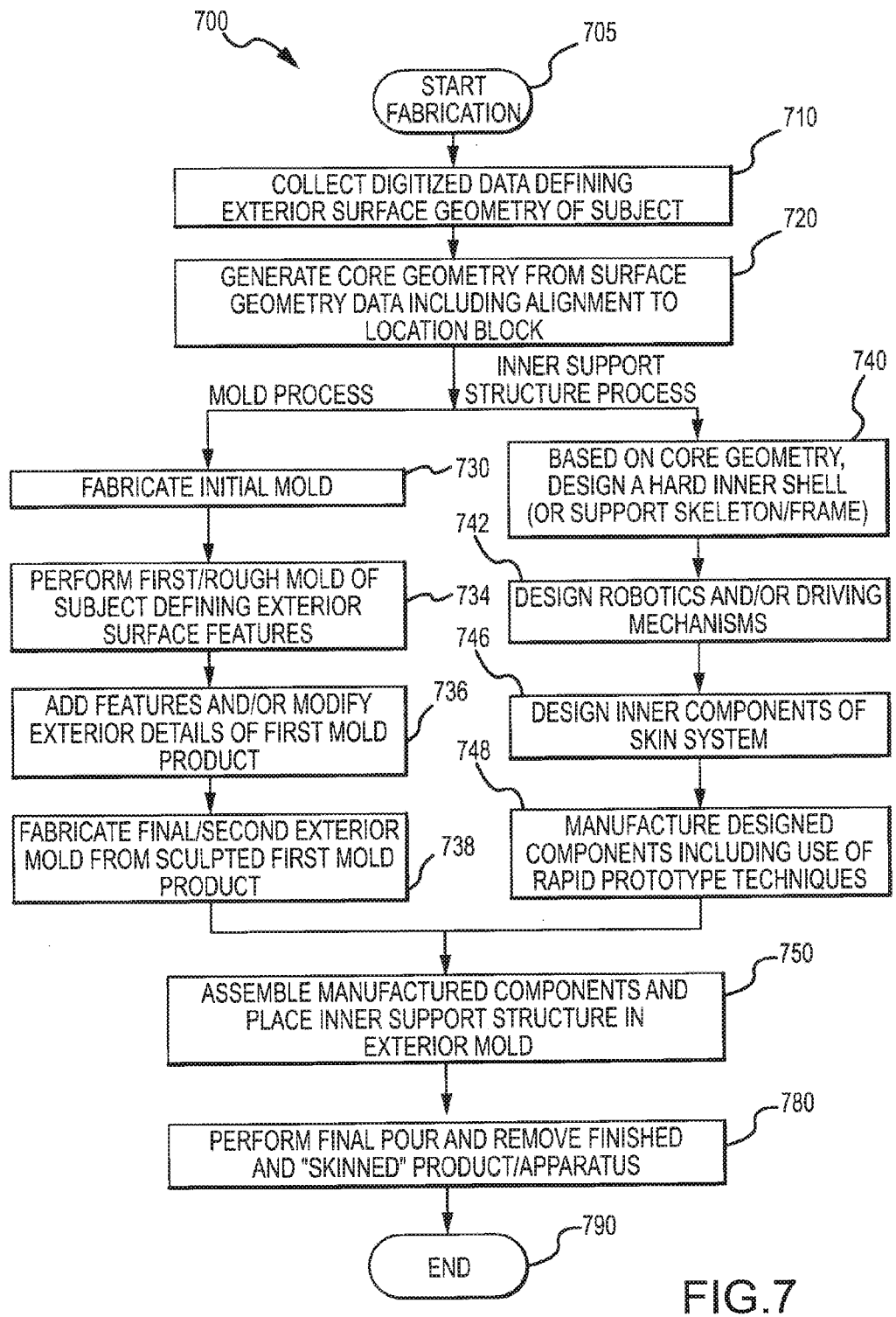
FIG. 7 is a flow diagram of a fabrication method for robotics and other assemblies that include a skin system.

FIG. 7 illustrates a fabrication method 700 that incorporates features of the present invention to facilitate more time efficient, less labor intensive, and less costly design and manufacture of products or assemblies that include an outer skin system. Such products and assemblies may include robotics-based apparatus such as devices used to simulate human, animal, character, or the like movement including facial movements. The following discussion provides examples of using the method 700 for fabricating a robotic head, but, with this example understood, it will be clear that similar steps and techniques may be used for nearly any assembly or object in which a covering or skin system is applied over an inner support structure, frame, or skeleton. The method 700 is particularly well suited for creating skin systems for subjects or base objects such as heads that are viewed from all directions such as for forming a skin system for a robotic head that has no seams or removable panels (e.g., the robotics or drive devices need to be insert through a base (or neck) opening and cannot simply be placed in through a removable panel).

As discussed with reference to FIGS. 1-6, this type of robotic apparatus (e.g., head or the like) generally includes an inner support structure and an exterior skin layer. The inner support structure includes a hard shell or frame, flexible/soft inner skin system components (such as backing for a face and a flexible but somewhat harder/tougher mechanism insertion section or force receiving component), and robotics or drive mechanism that typically mate with and drive part of the inner support structure. The exterior skin layer is created with a final pour around the assembled inner support structure to provide the detailed exterior of the robotic head or other "skinned" product, and the poured exterior skin layer bonds at least with the inner skin component to form the overall skin system. The robotics, such as a mouth driving mechanism or facial emotion/movement device, may be inserted post-final pour such as up through the neck or base opening and fit into place (e.g., to mate with the force receiving portions of the skin system).

At step 705, the fabrication method 700 starts such as with choosing a subject or base object to be modeled (e.g., an existing physical sculpture, a 3D modeled object, or the like) with a robotic device, and, in the following discussion, it is assumed that the subject is a head of a human or character such as shown in FIGS. 2-6. At 710, digitized or digital data defining the exterior surface geometry of the chosen subject is obtained or collected and stored in memory of a computer system or on a memory device. In one embodiment, the surface geometry data for later computer modeling is obtained by using a laser scanner or similar device to scan or process the subject (e.g., person's head, character's head, or the like). The laser scanner produces or outputs point cloud data that can be used directly or after further processing to create a digitized computer model or core geometry of the subject in step 720. For example, the surface geometry data may be imported into a CAD or similar program or tool and processed as necessary to define a core or base geometry. In some embodiments, there is no existing subject or object to scan, and the surface geometry data is formed by importing or creating a 3D computer model defining an exterior surface geometry (e.g., a new character/face for use on a robot or the like).

The surface geometry or subject computer model may be aligned with a predefined location or alignment block (e.g., a computer definition or model of a block with one or more attachment points may be retrieved from memory and attached to the digitized model of the surface geometry of the subject). Alignment of the location block is useful for proper sculpting, molding, casting, and 3D modeling processes and is used in many or all of the later manufacturing/fabricating steps of method 700. The base geometry is later used for producing the inner support structure (such as with an offset for the thickness of the exterior skin layer from the base geometry outer surface) and designing its components (e.g., the core geometry's dimensions and shapes are subdivided into components such as skin system components and the hard shell). Note, if the material that is used to form the exterior skin layer has a known or expected shrink rate, the surface geometry model may be increased in size or scaled upward to account for such shrinkage, and, in some cases, it may be appropriate to use a greater thickness for the skin layer in creating the base geometry.

The method 700 can now proceed along two parallel paths (or these may be done sequentially) including a mold/sculpt process and a design/manufacture of the inner support structure. The design/manufacture process often will involve use of a CAD module or similar tool to design the inner structure components (e.g., items used in the final pour or casting procedure 780), and this parallel process may involve designing mechanisms to provide the robotic functions (e.g., drivers that mate with the soft inner skin system components such as force receiving components). Note, this differs significantly from a more standard robotic fabrication process in which the designer/fabricator typically has to wait for sculpting and molding processes to be complete before they can design internal pieces to mate with products of these processes (e.g., a base geometry is not known beforehand).

Along the mold process path, an initial or first exterior mold is fabricated at 730. This step may include producing a rapid prototype part based upon the core geometry (e.g., an RP head) that is configured to assemble onto a location block (which may be fabricated at 730 but more typically is prefabbed with its dimensions input to the modeling module for use in modeling the base geometry alignment/attachment to such a block/support). The RP head (or otherwise fabricated/prototyped head) is typically not detailed and generally represents the shape of the original subject or head that was scanned in step 710. The RP head/block may be considered a sculpt assembly and this may be provided to and used by a mold maker to form the initial or first exterior mold at 730.

At 734, the sculpt assembly is removed from the first or initial mold and a structure is built or fabricated that mounts to the location block and provides room for receiving pliable/sculptable material (e.g., a receiving structure for clay or other moldable material). The structure and location block are then placed back into the initial exterior mold. Oil-based clay or other moldable material is heated such as in a double boiler or the like (or otherwise placed in liquid state) and poured into the mold over the receiving structure. The clay is allowed to cool and the structure, block, and clay are removed from the exterior case mold. At 736, the clay shape with the location block is provided to a sculptor or artisan such that features can be added and/or modified to provide desired exterior details. The clay shape or rough mold product is nearly an exact match to the core geometry or exterior surface model, and step 736 often will not involve significant modifications and changes to the exterior surface.

At 738, the method 700 continues with fabricating a final or second exterior mold around the now sculpted product of the first molding process 734 and the attached location block. The exterior mold is removed, and this exterior mold can be used for casting (such as at 780) final cast parts or "skinned" products. Additional location blocks may be machined with the same outside dimensions and mounting locations for supporting inner support structures, and these will each fit in the final exterior mold formed at 738. In practice, the location blocks may have various cutouts, bleed holes, and/or attachments to accept different bracketry and shapes (or inner support structures) to be cast or poured around to form the final product.

Referring now to the parallel steps of fabricating the inner support structure, the core geometry formed in step 720 is used as the main reference to designing the inner support structure and its subparts such as inner portions of the skin system. First, at 740, based on the core geometry a hard inner shell or support structure is designed. This may involve creating an offset model or geometry with the 3D modeling/design module (e.g., a CAD-based tool or the like) by moving inward an offset distance equal to the desired or expected thickness of the exterior skin layer, and again, this offset distance may be selected so as to account for possible shrinkage of the material used in the final pour or casting 780. The structural shell is used in the final assembly or product to house and support the flexible components of the skin system and to support the driving mechanism/robotics used to move the face (or portions of the skin system), and hence, the design of the shell may include removing an area to provide a location and support surfaces for inner skin system components and supports/attachment locations for the robotics.

At step 742, the method 700 includes designing (such as with a CAD or other design/modeling tool or module) the robotics and/or drive mechanisms to be used in the robot head or other finished product such as to provided desired movement such as expressions, mouth motions, and the like. Then, at 746 (or this step may be done prior to step 742), the inner components of the skin system (e.g., the soft backing component and force receiving components shown in FIGS. 2-6 or the like) are designed so as to properly mate with the shell and with the driving mechanism/robotics. In some cases, these components are simply chosen to be portions of the shell (e.g., a section of the offset model created from the core geometry) with features similar to or matching the exterior surface geometry (e.g., ears, nose, lips, eyes, etc but offset a distance to allow for the exterior skin layer thickness). In the example shown in FIGS. 2-6, the inner skin system components include a flexible intermediate section or force receiving component that can attach on one side to the robotics and on its outer side to the flexible exterior skin that will later be poured over it. Because both the exterior skin and the driving mechanism/robotics were designed with the 3D computer modeling tool/module, the force receiving component can readily be designed/defined with the same or similar tool/module by building/filling between the other two previously designed/defined components. Also in the FIGS. 2-6, the robot head example includes a soft, flexible backing component (e.g., a backing portion of the skin system that may be of a lower durometer material or a foamed skin), which functions in the robot head to support portions of the flexible exterior skin. Again, in step 746, the 3D computer modeling/design module may be used to build or form the backing component between or in the space between the force receiving component, the shell receiving surface (or by altering the opening size or shape of the shell with the shell being altered to accommodate this support or backing component), and the exterior skin layer. The design steps at 740 and at 746 involve defining specific shapes and dimensions of every surface of these components, and all this design/modeling data is stored in memory by the 3D computer modeling/design module.

At step 748, the designed components of the inner support structure are manufactured based on the computer models/design definition information. Because the design has been done with a computer modeling program such as a CAD-based design tool, the structural shell and some of the internal mechanism/robotics may be fabricated using rapid prototyping techniques such as fuse deposition modeling (FDM) or the like, which decreases hand labor and, therefore, costs and also provides repeatable fabrication/duplication of these components. Further, some of the components will be cast or molded such as using liquid silicone or the like for skin system components. To this end, the designed inner skin system components (or their digitized model(s) and related data) are used in step 748 to design and fabricate molds for these components. Also, because the design is typically performed using parametric CAD software or the like, changes can be made to the components of the inner support structure and all neighboring, related, or effected components are typically also updated or modified to suit these changes (and, in some cases, the molds for these changed parts are also automatically changed), which leads to simplified and efficient design changes and prototyping iterations. The molds, as well as the structural shell, may be created (or printed) using rapid prototype machines, with differing machines being used depending on the strength and surface detail required. From the printed molds, the inner support structure components are cast to have a desired flexibility/hardness and the like.

At 750, the method 700 continues with assembling of the components formed in step 748 to form the inner support structure (typically without the robotics). As discussed with reference to FIGS. 2-6, the structural shell, the flexible movement/backing component(s), and the force receiving component(s) may be bonded together with adhesive to keep the parts together during the final pour process 780. This assembled inner support structure is mounted upon a location block and then placed within the exterior mold from step 738 with the location block mating with the outer walls of the mold to align the inner support structure within the mold cavity. In some embodiments, brackets or bracketry is also made and provided to further support and align the force receiving and/or other components of the skin system that may tend to move during the final pour without additional support. The bracketry may also be mounted to the location block, and it is provided due to the pressure/forces introduced into the mold during the final casting process 780 to align the components initially and to retain them when under pressure/forces.

At 780, the final pour is performed to form the exterior skin layer of the skin system. Silicone or a similar material is poured into the mold around the assembled inner support structure, and a single bonded skin system is formed as the exterior skin layer material bonds with the inner skin system components provided in the inner support structure, and the shell provides mechanical/structural support of the flexible skin (e.g., similar to a skull or other skeleton/frame). The "skinned" product or robot head is removed from the mold, and, in some cases, the drive mechanism or robotics are installed by removing the location block and inserting the robotics up into the head through the neck opening, with the robotics connected to the force receiving component and, as needed, to the structural shell on receiving shelves/ledges or the like. The final pour at 780 is useful for both picking up the detail of the sculpture or subject and also to provide a final bond of all the components of the robot head or other "skinned" object. The method 700 then ends at 790 or is started again at 705 such as with selecting a new subject or target object for use in the fabrication method 700.

Figure 8:
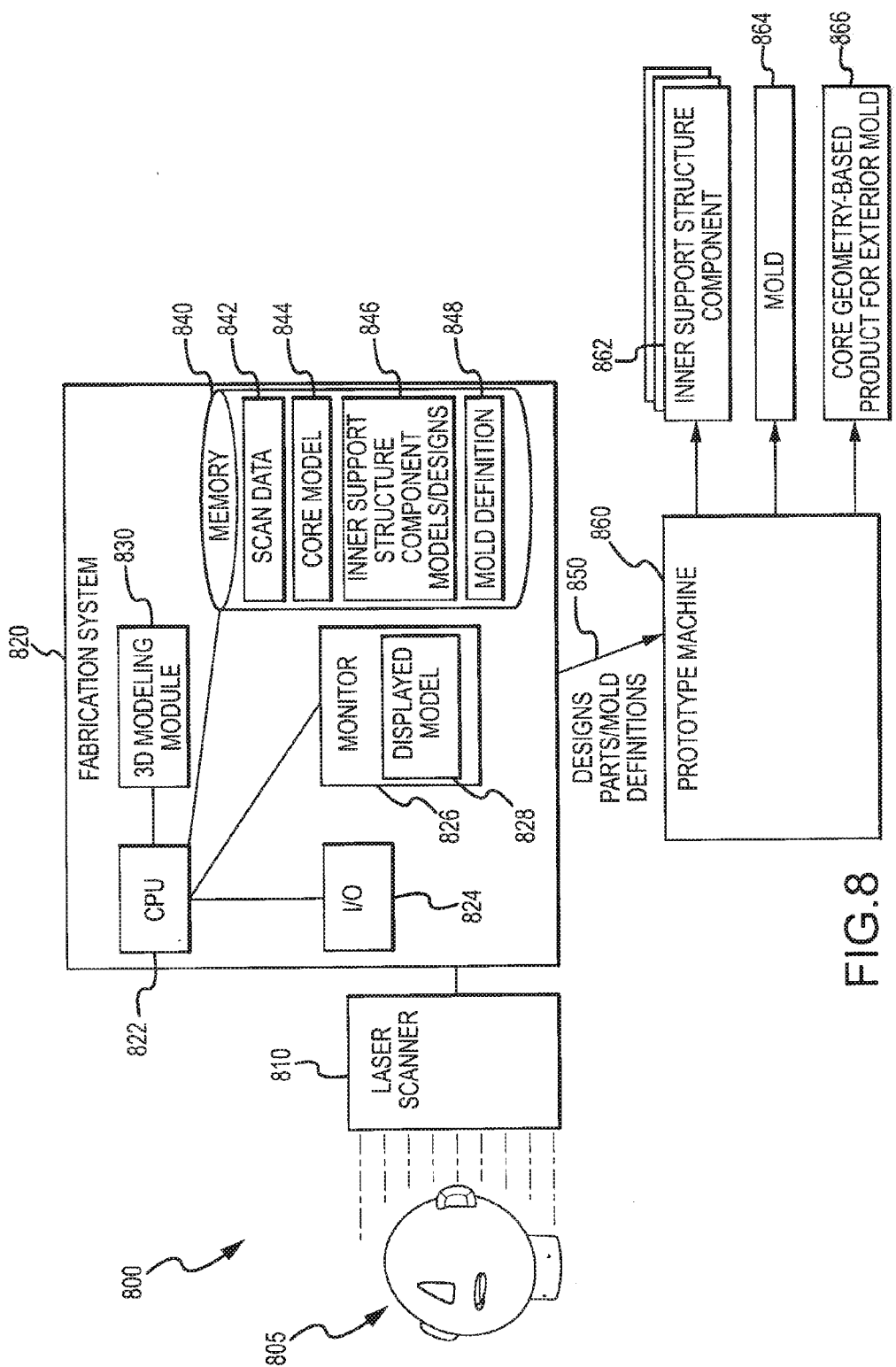
FIG. 8 is a functional block diagram of a computer-based system for designing/modeling a robotic device or other product that includes an inner support structure and an outer skin system.

FIG. 8 illustrates a computer-based design system 800 for use in producing a skinned object such as a robotic head or other assembly/structure that is covered with a skin system. As shown, a subject or base object 805 is selected such as a sculpted object, e.g., a human, animal, or character head or other body parts. The system 800 includes a scanner 810 that operates to determine the exterior surface dimensions and/or geometry of the subject 805 and this information (e.g., cloud data or the like) is transferred to a communicatively-linked fabrication system 820 where it is stored as scan data 842 in memory 840. The system 820 may take the form of a conventional computer device such as a handheld, laptop, notebook, desktop, or other computer. The system 820 typically includes a processor 822 that controls operation of input/output devices 824 (such as keyboards, mice, joysticks, touch screens, voice controls, and the like) as well as a monitor 826 that may be operated to display a GUI and/or as shown a model 828 that is being created and designed by the system 820. The CUI 822 further runs a 3D modeling module, tool, or software program/application 830 such as a CAD-based tool or the like.

The module 830 acts to process the scan data 842 (as discussed with reference to method 700 of FIG. 7) to create a core or base model 844 that defines, at least generally, a 3D model of the subject 805. The module 830 may further function to output this definition as shown at 850 to a prototype machine 860 such as an FDM machine or the like for use in fabricating a core geometry-based product 866, which may then be used in creating an exterior mold(s) for producing an exterior skin layer. The module 830 may also be used, such as with input/interaction with a designer via I/O 824 and monitor 826, to design and model an inner support structure and its components (e.g., a hard shell/frame, soft skin components to be provided on such frame to be exposed to later-poured exterior skin, and, optionally, robotics/drive mechanisms to mate with the shell and/or inner skin components). Such modeling is performed based on the base model 844 (e.g., with an offset for the skin thickness of exterior layer but using scanned surface geometry data 842). The 3D modeling module 830 may output 850 this data 846 to a prototype machine 860 for use in fabricating all or some of the inner support structure components (such as the hard shell and portions of the robotics) 862. Further, the 3D modeling module 830 may be operated by the processor 822 to allow a designer to prepare mold definitions 848 based on the designs/models 846 of the inner support structure components such as soft backing components or force receiving components. These mold definitions or mold data 848 can be exported/transmitted 850 to one or more types of prototype machines 860 for production of molds 864, which in turn may be used to cast these components for use in the inner support structure assembly.

Figure 9:
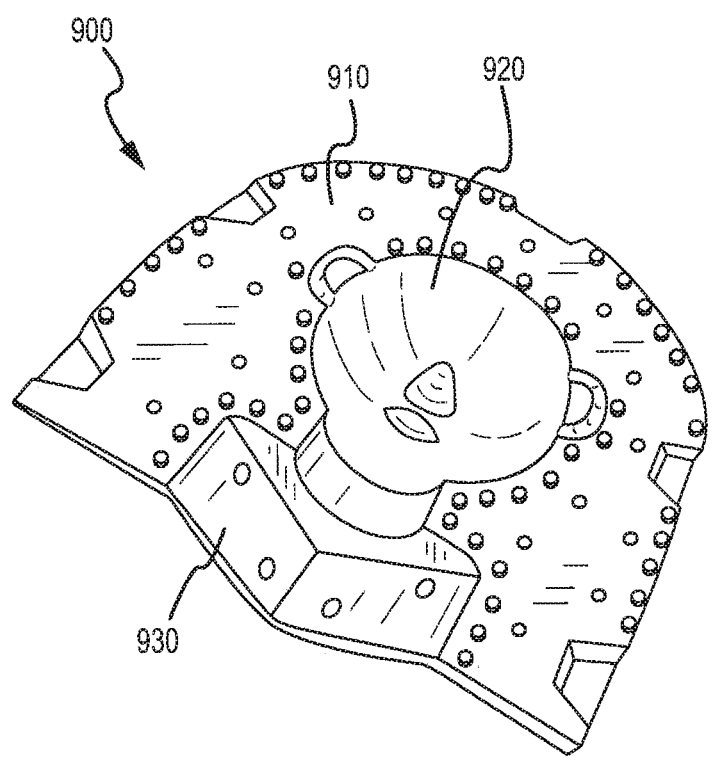
FIGS. 9-11 illustrate an exterior skin mold and its use as part of a skin fabrication process including placement of an assembled inner support structure.
Figure 10:
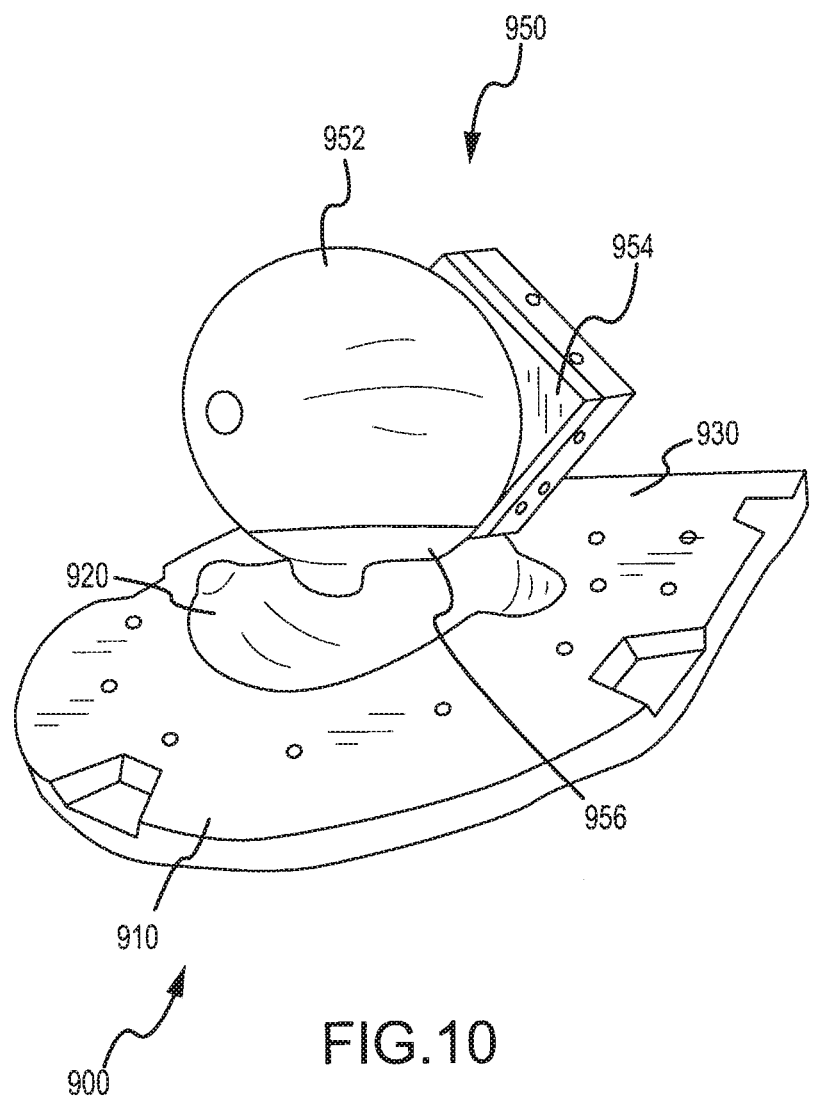
Figure 11:
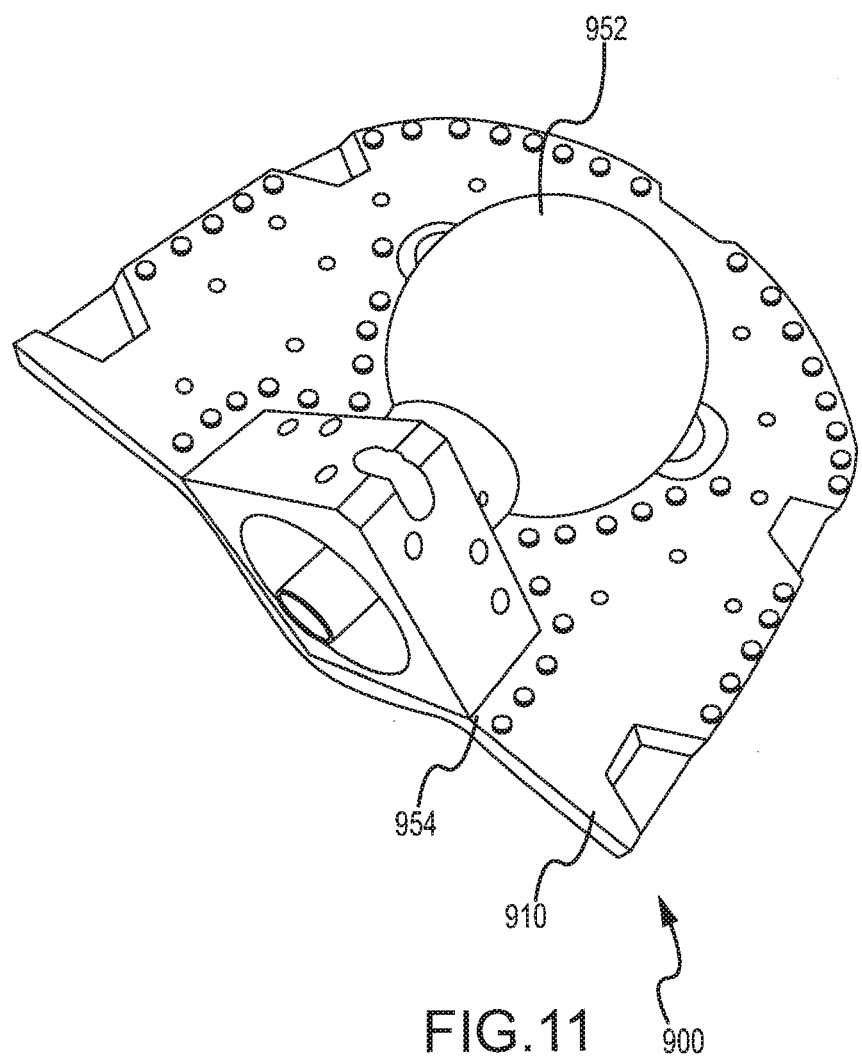

FIGS. 9-11 illustrate an exterior skin mold 900 and its use during a portion of a skin fabrication process of the invention. As shown in FIG. 9, the mold 900 includes two halves or sidewalk with a front sidewall 910 shown, and, in this example, the main cavity 920 includes features of an exterior surface geometry of a subject (such as a face/head). The surface geometry provided by the cavity 920 would be formed, as discussed above, by first fabricating (such as with rapid prototyping or the like) a model/sculpt based on a core geometry definition (e.g., based on scanned data of an original object or subject that is then modeled or processed into the definition by a 3D modeling program or the like). The front sidewall 910 further includes a recessed surface 930 for receiving a location or alignment block, structure, member, or element, which is used to align an inner support structure relative to the surfaces of the cavity 920 (e.g., to space the shell and inner skin components a particular offset or distance away to provide room for the exterior skin pour), and the alignment recess 930 is provided in the mold sidewall 920 by creating the mold 900 using a sculpt assembly formed based on the core geometry that is mated with/mounted upon a location block.

FIG. 10 illustrates the step of the fabrication process in which an inner support structure 950 is positioned within the cavity 920 and alignment recess 930 portions of the mold sidewall 910. Specifically, a structural shell 952 with an inner skin component (e.g., soft hacking component) 956 attached is placed proximate—but offset a distance for the skin layer from the surface of cavity 920 of wall 910. The shell 952 and skin component 956 is positioned accurately in the cavity 920 by mating the alignment/location block 954 (and, in some case, fastening with one or more fasteners) to the recess 930 in sidewall/mold half 910. FIG. 11 illustrates the mold 900 with the alignment block 954 and shell 952 of the inner support structure 950 positioned in the mold sidewall/half 910. A small space such as 0.125 to 0.25 inches is provided about the shell 952 to allow liquid silicone or other flexible material with a desired hardness to flow. The final pour or casting step is performed after another half or sidewall (not shown) is mated to the sidewall 910, and the mold 900 is configured with flow paths for the final pour. In the illustrated example, the exterior skin would flow about the entire head (or shell) 952 and neck but would be blocked from flowing about the block 954. In other embodiments, the exterior skin may only cover a portion of the shell 952 and/or skin components 956.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above examples have provided examples of using skin systems of the invention with robotics, but the skin or covering systems of the invention are, of course, readily adaptable and useful in other applications in which it is desirable to cover a still or rigid frame or support structure or a dynamic or movable frame or support structure such as with materials having two or more hardnesses or differing flexibility and/or durability. As a result, the use of the term "skin" is not intended as being limited to human or animal imitating robots, toys, or devices, but it is instead to be inclusive of nearly any covering assembly or layered overlay that may be applied to or used as a covering (typically, but not always, an external covering).

The fabrication method may use a variety of rapid prototyping techniques once the core geometry model is created and inner support structure components are designed and/or modeled such as using a CAD-based 3D computer modeling program/routine. One useful rapid prototyping technique that may be used to form inner support structure components or molds to facilitate casting of such parts is fused deposition modeling (FDM). In FDM, plastic parts may be manufactured by depositing or printing a filament on a layer by layer basis directly from 3D CAD or other modeling/design data (e.g., a file(s) containing geometric models or the like formed with a 3D CAD workstation or the like) provided to an FDM machine/device. For example, semi-liquid thermoplastic material (ABS) may be extruded and then deposited in thin layers from an FDM head one layer (or slice) at a time. The parts formed with FDM may have a rough surface finish, but this is typically acceptable for inner skin components and other parts such as the hard structural shell and robotics components. In other embodiments, rapid injection molding is utilized for some of the components, and this involves providing the 3D CAD part models to a rapid prototyping system that automates the process of manufacturing molds based on such models (e.g., by producing molds using aluminum or other alloys or materials and using precise, high-speed CNC machining such as three-axis CNC milling or other techniques).

The above description provided numerous examples of providing a multi-component skin system for which only a small number of robotics drivers were utilized, e.g., a puppet-like animatronic head. In other cases, though, the inventors have strived to address issues with creating an extremely realistic audio animatronics character head or other skin-covered robotics device. Realistic skin and robotic interaction requires a higher level of detail and accuracy than previously achieved from initial sculpt to final fabrication and assembly of parts.

In the following portion of the description, the inventors describe additional methods and system for taking an object (such as a sculpt of a person's head or a character's head) in the physical world of the artist to the accurate world of engineering/robotics. These methods and systems allow the designer and fabricator to retain the ability to modify and tweak/adjust the design back and forth between functionality and artistic features (e.g., want the robotics and skin to have the irregularities in look and function as found in the person or character being replicated with a robotic device or product such as an imperfect smile, the way one person moves their eyebrows versus another person, a crooked jaw that makes a mouth move differently, and so on). The following discussion again uses the example of designing and fabricating a robotic or animatronic head that includes a robotics assembly with drivers/actuators in a hard shell that is covered by an elastomeric skin system, but, in the following example, numerous drivers are utilized, the skin includes integral elastomeric actuation points or pieces (EAPs), and the skin is a single layer (e.g., does not include force receiving components as these are replaced with EAPs and does not include a backing element).

Figure 12:
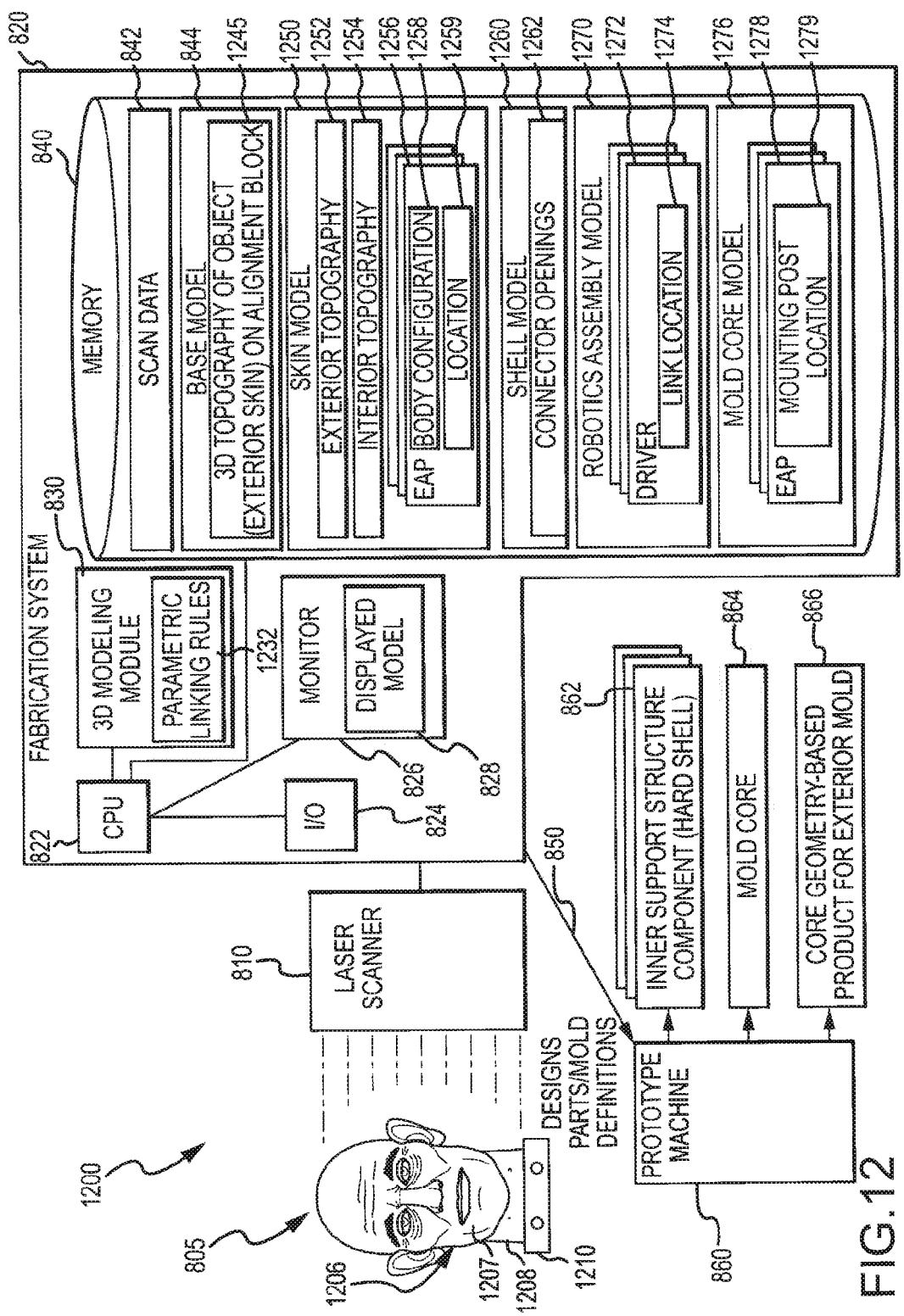
FIG. 12 a functional block diagram, similar to FIG. 8, of a computer-based system for designing/modeling a robotic device such as an animatronic head that facilitates a digital design process with iterative loops to allow artistic and mechanical/robotics-driven design changes to be implemented accurately and effectively and also with fewer time requirements and at less expense.

FIG. 12 illustrates a computer-based design system 1200 that is a modified form or expanded form of the system 800 of FIG. 8 with like components having like numbering (and not being fully described again at this point). The system 1200 is configured for use in producing an animatronic or robotics device such as a robotic head or other assembly that includes robotics mechanisms that are covered with a skin system, such as the skin 1640 shown in FIG. 16 that includes a plurality of EAPs for mating with driver arms or links extending outward from or through a hard outer shell or housing.

As shown, a subject or base object 805 is selected for use in forming a skinned robotic assembly or device. In this example, the device being created is an animatronic head, and the object/assembly 805 includes a sculpt 1206 of a person/character (such as a president or other famous individual or a character from a movie or the like). The sculpt 1206 in this case includes a face or exterior skin shape 1207 with a large amount of detail based on an artist's efforts to recreate the subject's facial characteristics. Significantly, the system 1200 makes use of an alignment or location block throughout its processes to ensure that various components may be modeled digitally in a spatially accurate manner and later fabricated within a mold in proper alignment. Specifically, the alignment or location block has its location designated or set within the mold assembly, and the mold core is first modeled/designed on a virtual representation/model of the block, second fabricated, and third mounted on a block matching the virtual block for proper positioning in the mold assembly.

With this in mind, the subject/object assembly 805 is shown to include an alignment or location block 1210, and the head/sculpt 1206 is affixed to the block 1210 with a neck or lower portion 1208 mated to the upper surface of the block 1210. In some cases, an artist may create the sculpture 1206 on the block 1210 (e.g., the working materials for the sculpt 1206 may be placed on block 1210). Although not shown, the virtual representation/model of the block 1210 may be stored in the memory 840 for use by the 3D modeling module 830 in ensuring alignment of components with the alignment block 1210 such as by matching a scanned surface of the block 1210 of object 805 with the digital definition/model of the block 1210.

The system 1200 includes a scanner 810 that operates to obtain the exterior surface dimensions and/or geometry (3D topography) of the sculpt 1206. Further, the scanner data includes a scan of the block 1210 with the sculpt 1206 on the block 1210 such that the gathered scan data provides a spatial relationship between exterior surface 1207 and the block 1210 (e.g., the tip of the nose of the face 1207 has a 3D offset from each point on the block 1210). This information (e.g., cloud data or the like) is transferred to a communicatively-linked fabrication or computer-design system 820, where it is stored in digital form as scan data 842 in memory 840.

The module 830 acts to process the scan data 842 (as discussed with reference to FIG. 7) to create a base model 844 that defines a 3D model of the subject or object assembly 805. This model may include a 3D topography definition 1245 of the exterior skin and its contours relative to the exterior topography (3D parameters of the block's exterior surfaces) of block 1210 (e.g., exterior skin that will be formed by a mold as well as its spatial relationship to the alignment block 1210). In some cases, the module 830 may further function to output this definition 850 to a prototype machine 860 for use in fabricating a product/core 866 for use in creating one or more exterior molds (such as a front and back half or shell of an exterior mold assembly) for use in producing an exterior skin layer or skin/skin system (e.g., after a core or mold core 864 is positioned within the exterior mold components to define a cavity associated with the skin/skin system).

Significantly, the 3D modeling module 830 is also configured for use in generating 3D models or digital representations/definitions of a core (or mold core) that can be used to build/fabricate a core for use in the mold assembly to define the inner surfaces of the skin-forming cavity. The core model 1276 is shown to be stored in memory 840 by the modeling module 830, and the core model 1276 is built by the module 830 to be mounted upon a model or digital representation of the alignment block 1210. The exterior surface of the core model 1276 is configured to generally mirror the exterior surface 1207 of head/face 1206, but, often, without detail features (e.g., a smoothed surface) and is provided at a preset offset distance (e.g., a desired thickness of the skin or of a cavity to account for shrinkage of a liquid as it hardens/sets).

In this way, a mold core 865 fabricated (such as in part or fully by the prototype machine 860 based on definitions 850 from model 1276) based on the core model 1276 will be accurately aligned with other mold assembly components including an exterior shell assembly, which is formed using the subject/object assembly 805 which includes the alignment block. As discussed in detail below with reference to FIGS. 13-16, the exterior surface of the core model 1276 includes a number of EAP mounting posts and these are modeled 1278, such that each of the EAPs 1278 is included in the model 1276 with the configuration of the particular mounting devices (a headed post, a flush magnet, and so on) as well as its 3D location (X-Y-Z coordinates) 1279 relative to the core mode 1276 and also the alignment block 1210.

Then, during iterative design processes, the EAP mounting posts 1278 may be replaced with differing mounting elements as well as moving their locations 1279, which causes corresponding and linked components to also move such as a driver link location 1274 and an EAP location 1259 (or vice versa as moving either the link location 1274 or EAP location 1259 also causes the EAP mounting post location 1279 to be moved and an update to model 1276 performed by 3D modeling module 830 such as based upon parametric linking rules 1232).

Such linking rules 1232 may define relationships among various components of the model/skin system that have to be maintained during changes and reiterative design steps. For example, the EAPs 1256 may have to have their locations retained within the body of the skin model 1250 (e.g., between the exterior topography 1252 and interior topography 1254). Hence, when an EAP mounting post 1278 is moved to a new location, it has to be moved such that a corresponding one of the EAPs 1256 (i.e., the EAP that is mounted upon the post/element 1278) remains within the skin body of model 1250. Likewise, movement of an EAP 1256 from one location to another 1259 in the model 1250 is limited by the parametric linking rules 1232 such that the EAP 1256 is within the skin body of model 1250 with an opening/mating surface flush with the interior topography 1254. Additional rules 1232 may apply such as limiting movement of an EAP mounting post 1278 to locations 1279 that can be reached by a driver/actuator 1272 of the robotics assembly model 1270. The number of interrelations that could be listed is large in number. However, these examples allow one skilled in the art to readily understand that the 3D modeling module 830 functions to facilitate an iterative design process by allowing a designer via I/O 824 and GUI 828 to quickly try new designs for various skin system and robotics components and have each change stored in memory 840 as well as having other affected components automatically updated (e.g., changing locations 1259 of an EAP 1256 directly results in movement of an EAP mounting post 1278 to a new location 1279 on the core 1276, which causes a link location 1274 of a driver/actuator 1272 to be moved in the robotics assembly 1270 and the like).

With this in mind, the 3D modeling module 830 also acts to use the 3D topography 1245 of the object 805 on the alignment block 1210 to create a skin model 1250. The skin model 1250 includes an exterior topography 1252 that typically will match the scanned data for the exterior surfaces of the head or other object 1206 including its face 1207 and neck 1208 in this case. The model 1250 further includes an interior topography 1254 that is, as noted above, typically a smoothed or less detailed replica of the exterior topography 1252 at a preset or defined offset distance (e.g., a desired skin thickness). The space between the topographies or 3D surface models 1252, 1254 provides a digital representation of the body or layer of exterior skin for a skinned robotic device formed with system 1200 based on scanned data 842.

To allow the skin defined by surfaces 1252, 1254 to be attached to a robotics assembly, a number of EAPs may be designed or selected for inclusion within the skin. In some preferred embodiments, the EAPs are formed integrally with the skin as they are positioned within the skin cavity on the modeled EAP mounting posts 1278 and, by using elastomeric EAPs or otherwise accounting for proper bonding, the EAPs become bonded to the surrounding skin (see FIG. 16 for a skin 1640 with integrally bonded EAPs such as EAP 1430 associated with an eyebrow portion of the skin 1640). The 3D modeling module 830 may be adapted to allow parts (or a digital definition of such parts/components) such as EAPs to be imported and positioned within the modeled components.

For example, a designer may be able to choose a model of an EAP 1256 with a particular body configuration (e.g., circular with a socket or recessed surface for receiving a ball connection for a driver/actuator arm, tear-dropped shaped, cylindrical with one or two wings/arms, and so on) and then select a location 1259 for such an EAP 1256. This information is stored in model 1250 in memory 840, and linking rules 1232 may be applied such as linking each EAP to a link location 1274 of a driver or to a mounting post 1278 location 1279 associated with a skin locking location (e.g., some EAP mounting posts 1278 are used to represent skin locking components provided on a shell model 1260 as some EAPs in a skin may be used to lock the skin to the outer surface of the robotics shell/housing so as to retain the skin in one or more fixed locations such as at the tip of a nose of a human face or the like).

In designing a skin-covered robotics device, the 3D modeling module 830 further is useful for creating a shell model 1260 that defines a hard shell or housing (or multi-part assembly). The shell is used in practice to house a robotics assembly and also to provide an exterior surface for mating with the interior surface of the skin. Hence, the shell model 1260 includes a 3D representation of the exterior surface of the shell that typically matches the interior topography 1254 of the skin model 1250 and a thickness of material may be used to define a location/shape of an inner surface to define the body of the shell. The shell's exterior surface includes a number of connector openings 1262 that are defined to correspond with locations where drivers 1272 extend through the shell 1260 to connect with load-spreading EAPs. Further, the exterior surface of model 1260 includes a plurality of mounting posts for skin-locking EAP mounting posts/elements, and these correspond with the EAP mounting posts 1278 used for skin locking in configuration and location 1279. The shell model 1260 may be passed as definition data 850 to a prototype machine 860 for production of inner support structure components 862 (e.g., fast-prototype formation of a hard shell), and the mounting posts/elements for skin-locking EAPs can be mounted to the printed/formed shell 862 at locations defined in model 1260. The shell model 1260 is related in location with the alignment block 1210 such that the surfaces of the shell 862 as well as the EAP mounting elements and connector openings are accurately positioned relative to robotics assemblies formed using model 1270 and a skin system formed based on mold core 864 (and model 1276) and skin model 1250.

The 3D modeling module 830 further is useful for generating a robotics assembly model 1260 that is stored in memory 840. As with the skin model 1250 and its EAPs 1256, the robotics assembly model 1270 may be formed, in part, by importing digital definitions or models of robotic components such as drivers 1272 and their arms/linkages. The robotics assembly 1270 is again tied in its location to the alignment block 1210 and other components of the skin-covered product being modeled. For example, the link locations 1274 for each driver 1272 are defined to match the X-Y-Z coordinates or location 1259 of EAPs 1256 in the skin model 1250 as well as openings 1262 in the shell model 1260. As a result, a driver 1272 may be updated in its design/configuration in response to the movement of an EAP 1256 by the 3D modeling module 830, e.g., a link location 1274 may be moved to a different 3D location that may force a length of a driver arm to be shortened or lengthened to provide proper movement of robotic driver 1272.

Figure 13:
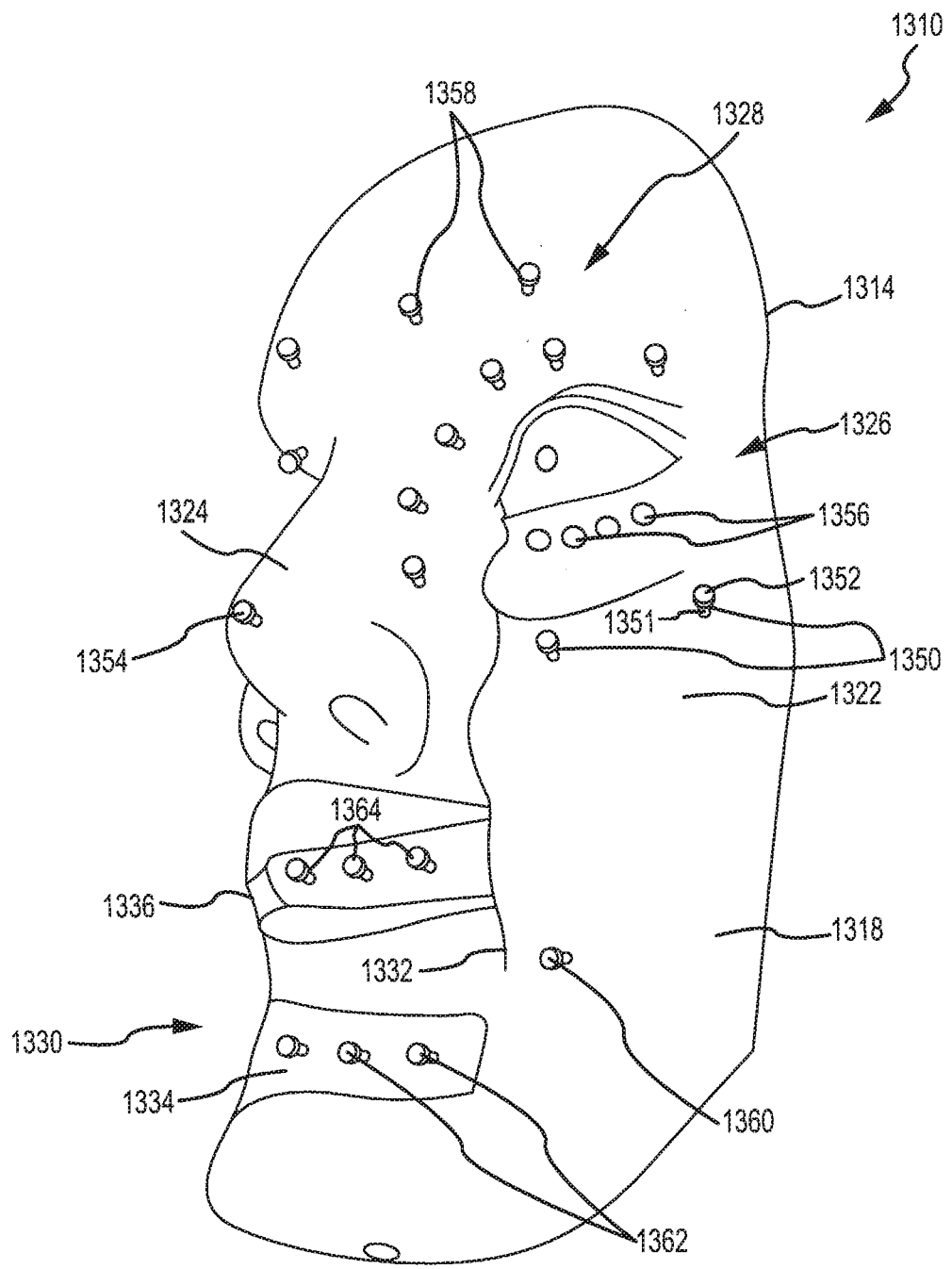
FIG. 13 is a side perspective view of a portion of a mold core (or inner skin defining mold component) that is fabricated with a number of mounting posts or connectors for precisely locating elastomeric actuation points or pieces (EAPs) within a skin that is molded using the core and for supporting the EAPs during the skin pour and hardening steps of the skin fabrication process.

FIGS. 13-16 illustrate exemplary cores and skin systems with integral EAPs that may be formed using the system 1200, and these figures and the corresponding description are useful for allowing one to readily understand how an efficient way of iteratively designing a skin and its corresponding robotics assembly (drives and outer shell) can improve the process and may even be required to achieve a truly realistic skin animation (e.g., to bring the artistic vision into a mechanical real world product). Referring to FIG. 13, a portion (e.g., the face or front portion) of a mold core 1310 is illustrated that may be provided as part of a skin fabrication process, with the core mold 1310 defining the inner surfaces of a skin or skin system. The core 1310 includes a body 1314 with an exterior surface 1318, which defines an inner surface of a cavity between the core and an exterior mold assembly that is later used to encase the core prior to pouring of a liquid. The exterior surface 1318 defines a number of facial features including a cheek 1322, a nose 1324, an eye 1326, an eyebrow 1328, and a mouth 1330 with lower and upper lips 1334, 1336.

The core 1310 includes a plurality of EAP mounting posts upon which EAPs can later be positioned so as to accurately locate the EAPs and retain them during pouring of skin-forming material into the mold cavity over the core 1310. Some of the EAP mounting posts are located in areas where it may be useful or desirable to simply connect the inner surfaces of the later-formed skin to the outer shell or housing of the robotics that will be covered by such skin. For example, some portions of the skin will not be directly moved by the robotics as the object/character they are simulating does not have a moving part or feature at such a location. As shown, the core is used to form a facial skin, and the cheek 1322, nose 1324, and mount corners 1332 may be portions of the skin that will not be driven, or actuated directly by a robotic actuator or driver, and one or more mounting posts 1350, 1354, and 1360 may be provided on these features of the exterior core surface 1318 (e.g., for receiving locking EAPs).

Each mounting post is configured to mate with and retain an EAP, and, when the EAPs include recessed surfaces or sockets, the mounting posts, such as posts 1350, may each include an elongated body 1351 that extends outward from the surface 1318 some distance (e.g., a relatively small offset such as less than about 0.25 inches and often less than 1/16 to 1/8 inches for many EAPs) to a point where a head or tip 1352 is provided (e.g., a ball or similar shape for insertion into a EAP socket when the EAPs and posts are configured as ball and socket type connectors). Of course, a wide variety of connection configurations may be used to allow the mounting posts to receive and retain EAPs, and, in some cases, the mounting posts are adapted to take a form similar to or even identical to that of the connecting portions of robotic actuators/drivers (e.g., if these rods/arms have a ball type connector then so do the mounting posts as shown for posts 1350).

Use of mounting posts with similar shapes to the ends of connectors to robotic actuators/drivers is particularly useful for the mounting posts provided for receiving the force-distributing EAPs. For example, the core 1310 may be configured to provide a plurality of mounting posts at locations exactly corresponding with connection locations for robotic drivers and actuators of a robotics assembly (e.g., where a driver arm or rod extends out from a hard outer shell or housing to connect with and animate a skin).

With this in mind, the core 1310 includes features that correspond with portions of a face that may move directly (e.g., in response to muscle, bone, or tissue movement), and these may include the eye 1326, the eyebrow 1328, and the mouth 1330. For the eyebrow 1328, a pair of EAP mounting posts 1358 are provided as, in this design, two spaced-apart EAPs will be used to distribute load or forces used to move the eyebrow portion of the later-formed skin. Similarly, the mouth 1330 is shown to include two or more (here three) spaced-apart mounting posts 1362, 1364 for each of the lower and upper lips 1334, 1336 to receive load-spreading EAPs, and, by positioning the mounting posts in locations that accurately are mapped to the corresponding robotics assembly, the EAPs are also accurately located in the later-formed skin such that the skin can readily be attached to the robotics assembly (with its skin locking posts and actuator/driver connection points/members).

In addition to mounting posts, the core 1310 includes mounting elements 1356 that are used to mount EAPs in the form of ferromagnetic strips (or other shapes), which are actuated magnetically instead of via direct coupling to actuators/drivers. These mounting elements 1356 may, therefore, take the feint of strong permanent magnets (such as rare earth magnets in button or other forms) that are positioned to be flush with the exterior surface 1318. As with the other mounting elements/posts, the mounting elements 1356 are accurately positioned on or proximate to the exterior surface 1318 of the core 1310 such that an EAP applied to the elements 1356 is automatically or necessarily accurately aligned with a magnetic actuator as the core 1310 is designed and provided based upon a particular robotics assembly design. EAPs are designed to provide realistic skin movement, and the locking EAPs work in conjunction with the load-spreading EAPs to achieve desired movement or animation of the skin containing these EAPs in response to application of forces by robotic actuators/drivers connected to the EAPs. The EAPs are attached to the core's mounting posts prior to pouring of the liquid skin-forming material over the core.

Figure 14:
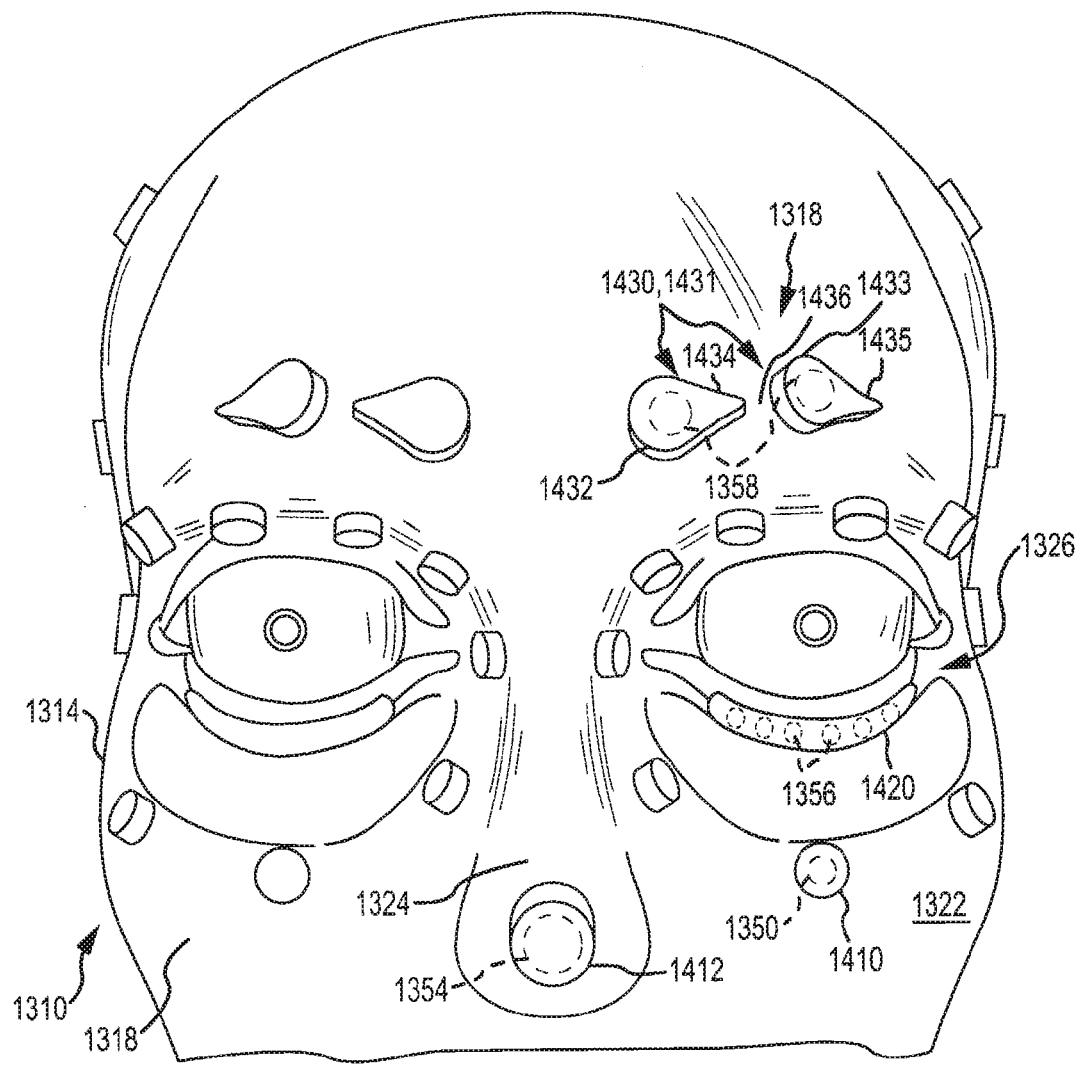
FIG. 14 illustrates a front view of a portion of the mold core of FIG. 13 showing the top of the core (e.g., the portion containing the eyes, eye brows, cheek, and nose corresponding to like parts of a robotic assembly to be covered with a skin formed with the core) after the application of locking and force-distributing EAPs to the mounting posts or connectors on the outer surface of the mold core.

FIG. 14 illustrates the upper portion of the core 1310 after the EAPs have been formed and installed on the mounting posts on core outer surface. As shown, a plurality of locking and load-spreading EAPs have been attached to the exterior surface 1318 by coupling them with the mounting posts/elements. For example, skin-locking EAPs 1410 and 1412 have been coupled (such as with a ball and socket-type connection) with posts 1350, 1354 on the cheek 1322 and nose 1324 of the core 1310. The locking EAPs 1410, 1412 may take the form of buttons or circular pads (or other-shaped pads) as shown, with relatively small diameters or size/surface area, to attach the encircling skin (after a skin forming step) to a robotics assembly shell or housing surface. The locking EAPs are typically located in portions of the skin (and the mounting posts 1350, 1354 on surface 1318) that will not move during operation of the underlying robotics or move only slightly in response to movement of adjoining portions. For example, a person's facial skin has a number of areas that generally may be thought of as non-moving or as anchor points such as the tip of their nose and upper cheeks.

In contrast, though, portions of the facial skin (or other skin system) will move directly such as an eyebrow or an eyelid. To support such direct movement in a realistic manner, FIG. 14 shows application of a number of force-distributing EAPs onto the core surface 1318. Specifically, an EAP 1420 in the form of a ferromagnetic strip is applied over the mounting elements 1356 such that this strip is positioned in the eyelid of a skin formed with core 1310. Also, on eyebrow 1318 of core 1310, a pair of EAPs 1430, 1431 is applied on mounting posts 1358 to provide load-spreading EAPs in the eyebrow portion of a skin formed with core 1310.

Note, two EAPs 1430, 1431 are used in the place of a single larger EAP, which may be used in some cases, as a more realistic eyebrow motion may be achieved with two robotic actuators or two robotics connection points. Each EAP 1430, 1431 is shaped similar to a raindrop with a circular body 1432, 1433 that mates with the post 1358 and with a tail or wing 1434, 1435. The tail 1434, 1435 extends outward from the body 1432, 1433 and reduces in size/width such that at its tip (or end distal to body 1432, 1433) the tail 1434, 1435 is much more flexible. Further, the tail 1434 of the first EAP 1430 is spaced apart by a gap 1436 from the body 1433 of the second EAP 1431 such that the two EAPs 1430, 1431 move at least partially independently. The use of a tail/wing 1434, 1435 in combination with the gap 1436 and two EAPs 1430, 1431 provides a more realistic eyebrow movement as it spreads applied forces provided by robotic actuators/drivers in a manner that effectively simulates a human eyebrow movement. The use of a plurality of locking EAPs placed about the socket of eye 1326 helps to stabilize the skin in these locations when the skin is applied to a robotics assembly, and this locking of the skin (such as with EAP 1410) when combined with movement of the skin with two specially shaped EAPs (such as EAPs 1430, 1431) acts to create a skin movement that closely replicates that of a human's face near their eye.

The number of EAPs, the EAP shapes used, their locations, and whether they are locking or force-distributing EAPs may be varied widely to practice the invention. The inventors have found that EAPs with wings, tails, or other portions that extend outward from the body are useful for many of the EAPs that are used to connect to the robotics as these shapes limit issues previously seen with point application of animation/skin-moving forces. The teardrop or raindrop shapes shown for EAPs 1430, 1431 have proven to provide a skin movement that accurately simulates human skin movement with underlying skin attachment points.

The material chosen for the EAPs may also vary to practice the skin fabrication methods and form a useful skin. The material may chosen to be a material that is compatible with the material used to form the skin such that when the skin-forming material poured over the EAPs and allowed to harden it integrally bonds with the skin material. In this manner, the adjoining skin either is held stationary by the EAP (such as with locking EAPs) or moves with the EAP (such as with force-distributing EAPs). In many cases, the material of the EAPs is chosen to suit its function with a hardness matching or exceeding that of the surrounding skin used for the locking EAPs and a hardness that exceeds, and, in some cases, is substantially greater than the surrounding skin being used for the force-distributing EAPs (e.g., to increase the durability of these load bearing surfaces/components). For example, some EAPs (or an inner bearing component as shown in FIG. 8) are formed of vulcanized rubber and/or a higher hardness silicone such as a silicone rubber with a 50 to 60 Durometer or greater hardness. The inventors have used such EAPs for both the locking and load-spreading EAPs with excellent results including long lives with repeated animation of the skin with robotics without tearing or failure.

Figure 15:
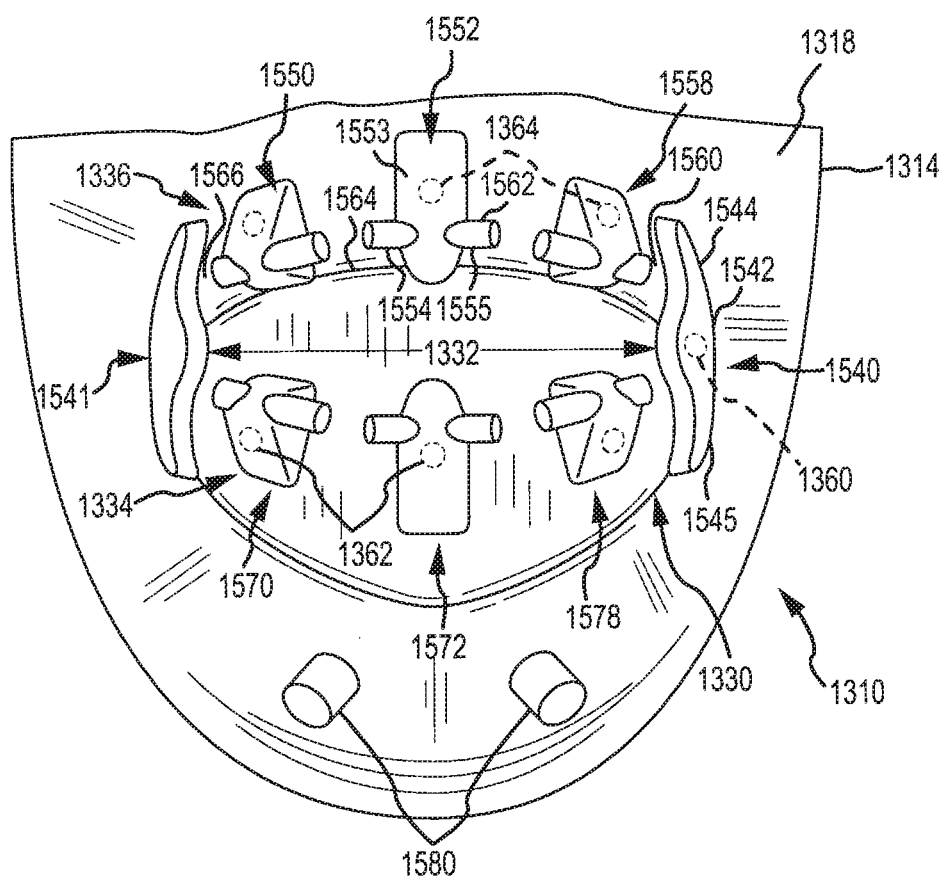
FIG. 15 illustrates, similar to FIG. 14, a front view of a portion of the mold core of FIG. 13 showing the bottom of the core (e.g., the portion containing the mouth and chin corresponding to like parts of a robotic assembly for which the skin is being fabricated to cover) after the application of locking and force-distributing EAPs onto the mounting posts of the core.

FIG. 15 illustrates the portion of the core 1310 that includes the mouth portion 1330 after the application of a plurality of EAPs to the mounting posts on the core exterior surface 1318. One difficulty with animating mouths in robotic characters is cracking at the mouth corners 1332. To address this issue, a pair of locking EAPs 1540, 1541 is provided on the mounting posts 1360 such that these locking EAPs 1540, 1541 are positioned at the edges or cracks of the mouth in the skin formed with core 1310. The EAPs 1540, 1541 act, when in use, to provide a connection point for the skin at the mouth edge/corner to a robotic outer shell/housing and also to block tearing/cracking. The shape of the EAPs 1540, 1541 may be a circular button as with other locking EAPs or, as shown, include a pair of arms or wings 1544, 1545 that extend outward from the cylindrical body 1542 (which provides an attachment point to the mounting post 1360). The arms or wings 1544, 1545 generally extend toward the nearby load-spreading EAPs 1558, 1578, and, as seen, are specially shaped and configured to suit the skin portion being replicated (e.g., a shape and movement (or lack thereof) of a human mouth in this case). The nearby EAPs 1558, 1578 (and 1550, 1570) are spaced apart by gaps 1560, 1566 such that they can be moved by a robotic driver independent of the stationary locking EAPs 1540, 1541.

Each of the lips 1334, 1336 provide three mounting posts 1362, 1364, and, as shown, three load-spreading EAPs 1550, 1552, 1558, 1570, 1572, 1578 connected and supported upon the core exterior surface 1318 at these locations. As shown for the upper lip 1336, it may be desirable to provide gaps or spacing 1562, 1564 between the EAPs 1550 and 1552 and 1552 and 1558 so as to provide a wider range of movement of a lip formed in skin using core 1310. To further facilitate animation of the surrounding skin including better distribution of forces to avoid a point application of force, as shown with RAP 1552, the EAPs may include a body 1553 that provides a socket/receiver for mating with mounting post 1364 (and, later, a robotic actuator/driver) such as a cylindrical body. From the body 1553, the RAP 1552 is shown to include a pair of wings or arms 1554, 1555 that extend outward toward the nearby or neighboring EAPs 1552, 1558. Upon pouring of skin material, these arms 1554, 1555 will extend away from the body 1553 into surrounding skin material such that when the body is directly moved by a robotic driver the arms 1554, 1555 and bonded skin will also move. In this manner, the animating robotic force is distributed over a much larger area of the skin. When combined with the use of six lip drivers versus only two, the range of mouth and lip movement achievable with a skin formed to integrally include the EAPs shown in FIG. 15 is significantly greater than prior skin to robotics connection techniques and can much more realistically simulate human mouth and lip movements.

Figure 16:
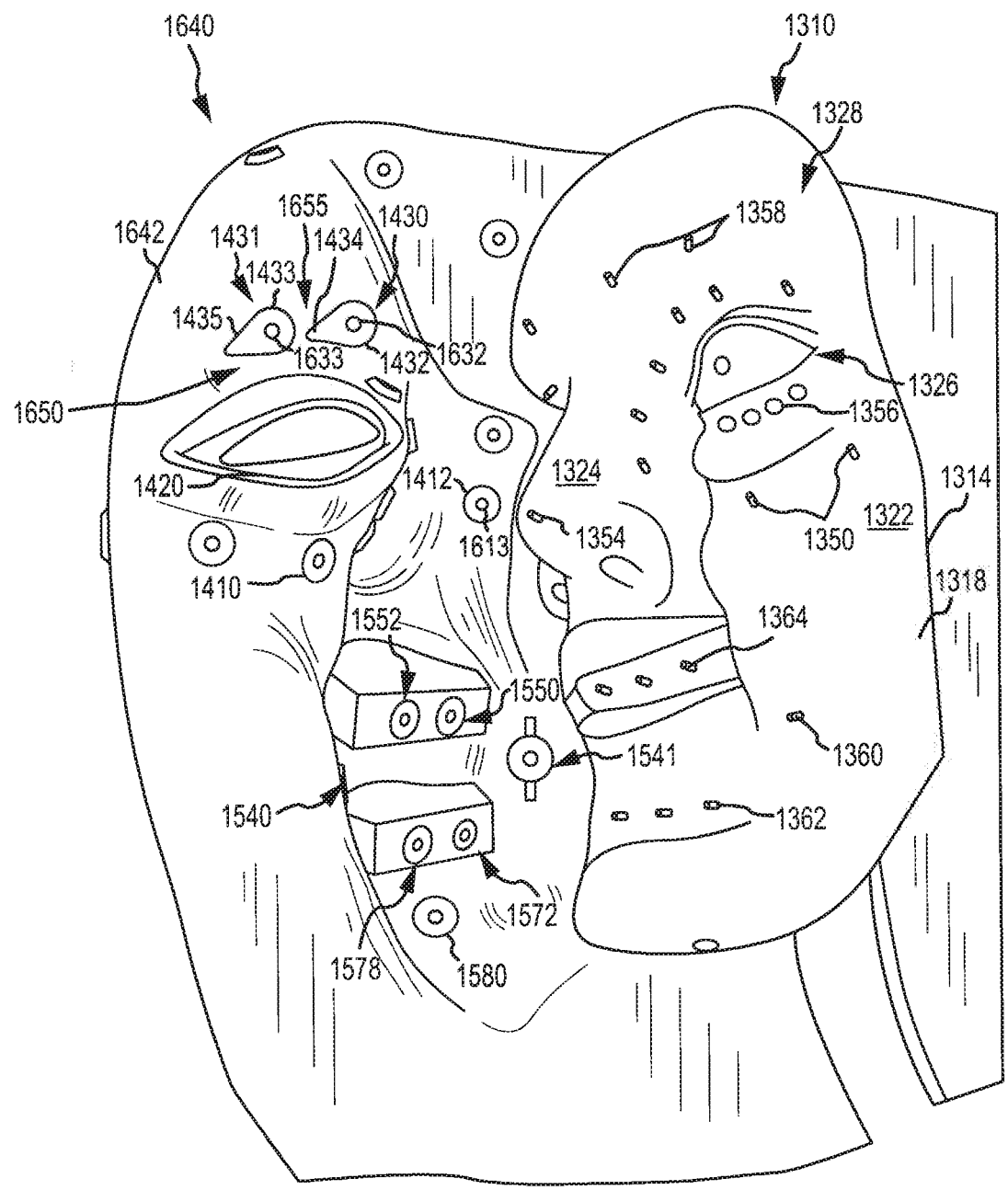
FIG. 16 illustrates the core of FIGS. 13-15 after a skin material pour, skin hardening, and disassembly of the mold assembly as the skin or skin system with the integral EAPs is being removed from or peeled off of the exterior surface of the core and EAPs are pulled off of the mounting posts.

FIG. 16 illustrates a fabrication step in which core 1310 has been used to locate and provide a plurality of EAPs. Specifically, the EAPs that were shown in FIGS. 14 and 15 to be applied on the core's mounting posts/elements have been integrally bound into a formed skin or skin system 1640. The skin 1640 is being removed from core 1310 and exposes the inner surface 1642 of the skin 1640. The EAPs generally are at least partially exposed on inner skin surfaced 1642 such that the EAPs can be applied over a robotics assembly. The robotics assembly is not shown but would take a form and shape similar to that of core 1310 with the surface 1318 being provided with a hard outer shell. The robotics assembly would include mounting posts/elements with similar (or even identical) configuration and location as the mounting posts/elements of core 1310. The robotics assembly may be operated to animate the skin 1640 in a realistic manner via the EAPs.

With reference to the eyebrow simulating portion of the skin 1640, the skin 1640 as formed includes the EAPs 1430, 1431, which are bonded to the surrounding skin 1650, 1655 such that when the EAPs 1430, 1431 are moved so is the skin 1650, 1655. The skin 1640 may be readily attached and detached from a robotics assembly that is configured with mounting elements similar to those provided on core 1310. For example, each of the EAPs 1430, 1431 has a body 1432, 1433 with an opening to a recessed surface or socket 1632, 1633, which has a size, shape, and depth that is selected to match a mounting or connection element of a robotics assembly (e.g., a ball or similar shape on the end of a drive or actuator rod/arm or the like).

Also, the bodies 1432, 1433 may be formed of relatively hard materials such as vulcanized rubber such that when the EAPs 1430, 1431 are applied to a metal or other material post they snap in place in an elastic manner that provides tactile and audible feedback to a technician applying the skin to the robotics assembly. Hence, the skin 1640 is easy to align with a robotics assembly's outer surface and its mounting elements, and proper connection is readily verified. Similarly, the other EAPs such as the EAP 1412 on the "nose" of the skin 1640 has an opening or socket 1613 that is accessible via back or inner surface 1642 of the skin 1640, and the skin 1640 can be locked or attached to a robotics assembly's outer shell with a post provided on the shell surface similar to post 1354 on nose 1324 of core 1310. In this way, the skin surface 1642 at the location of the locking EAP 1412 is hound to the shell outer surface causing the surrounding skin to stretch and compress with movement of the surrounding load-spreading EAPs (e.g., the skin 1640 of the nose may stretch when the mouth EAPs 1550, 1552 are moved away from the nose EAP 1412).

Figure 17:
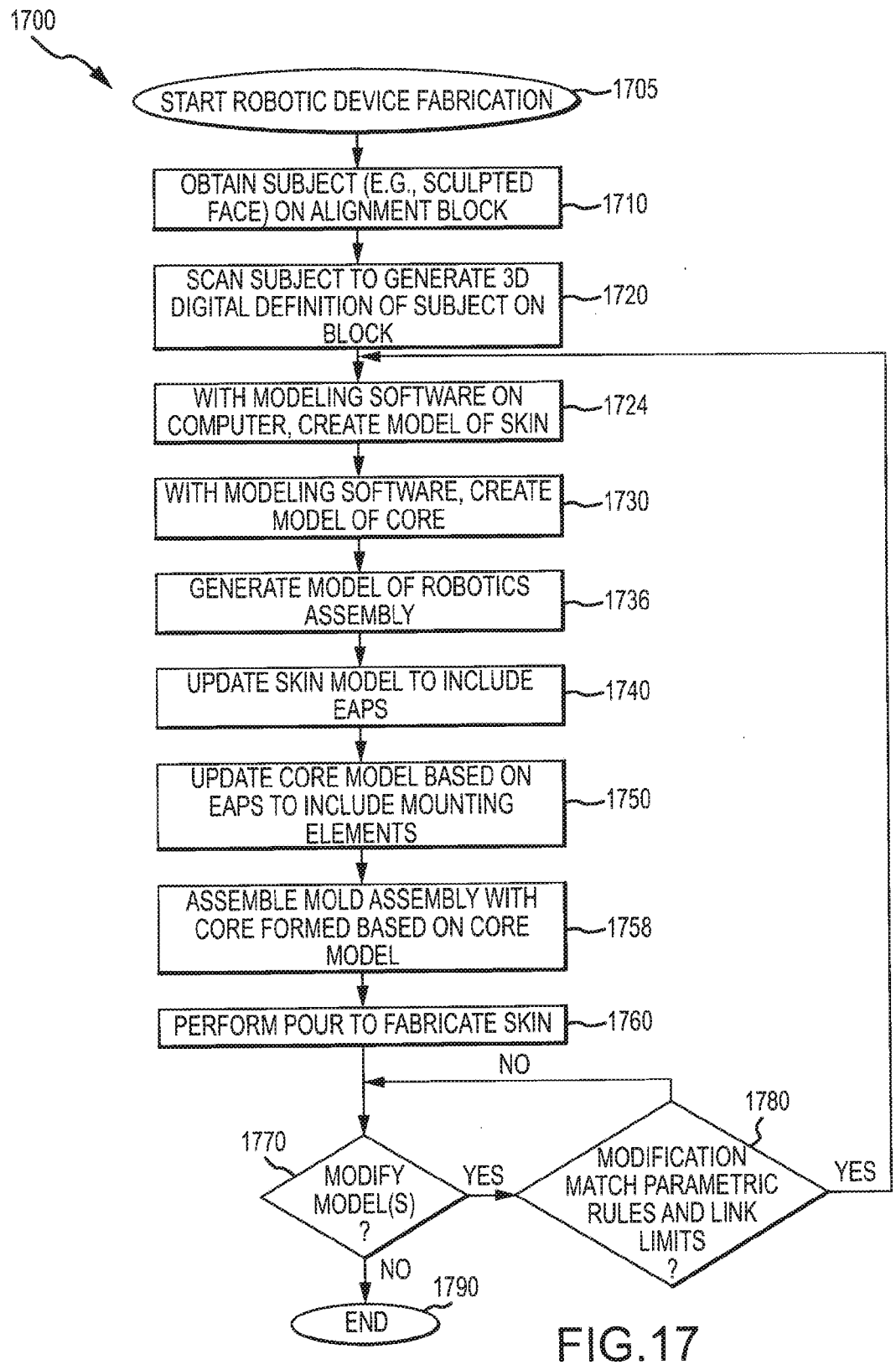
FIG. 17 is a flow diagram of a fabrication method for robotics and other assemblies that include a skin system with EAPs that shows use of modeling including an alignment or reference block and linking between model components (e.g., the skin and its EAPs with the core and its EAP mounting elements and both with underlying robotics devices such as drivers) to facilitate a desirable iterative design process.

FIG. 17 illustrates a fabrication method 1700 for a robotic skin (and its underlying robotics assembly) using the system 1200. The method 1700 typically starts at 1705 such as with loading a 3D modeling module onto a computer system and selecting an object or subject for use in creating a skin-covered robot (e.g., a head of a famous person that will be animated to simulate speech with robotics). At step 1710, a 3D version of the subject or object is obtained and mounted on a reference or alignment block. For example, a highly detailed sculpt such as a sculpted head may be created (e.g., an artistic rendering of a photograph of a president or the like) and mounted on a reference or alignment block, which is an accurately machined block formed based on a digital 3D model/definition of the block that is used by the 3D modeling module to spatially relate, locate, and link the modeled components. The block provides a physical link or tie between the physical world and the digital world (and back again).

In step 1720, the method 1700 includes obtaining a digital scan of the head or other object while it is properly mounted on the alignment block. This 3D digital definition of the subject on the block is stored in memory accessible by the 3D modeling module. Although not shown, a mold may then be fashioned around the sculpted head and also the block for use in providing outer mold elements that define an exterior surface of the skin (e.g., outer surfaces of a cavity between these mold components and a later fabricated mold core with EAPs on its outer surfaces). The scan data of the sculpt and block are an exact match to the interior of this mold.

From this point using the scan data and the 3D modeling module/software and a computer(s) running such software, a designer can design the mold core, all the robotic mechanisms, an outer shell (or shell segments) for containing the robotics and supporting the skin, and other parts such as the EAPs all within the digital scan data (e.g., the scan data defines a working/design volume in which all components have to be fit and spatially related to the block). The robotic mechanism attachment points and the mold core attachment points are the same within the CAD model created by the 3D modeling module. The core may be grown on a rapid prototype machine or the like and then bolted to the block. Then, when a skin is poured around the core (e.g., a volume of liquid is poured into the mold cavity) formed using the model, the skin and its integral EAPs match the robotic assembly including its shell and drives/actuators perfectly (when the robotic assembly is fabricated to the model, too).

With this in mind, at step 1724, the method 1700 continues with using the modeling software to create a model of the skin, and this may involve setting a skin thickness to define the exterior of the skin (mating with interior surface of exterior mold and scanned date for object) and interior of the skin at offset distance. At 1730, the method includes creating a model of the core for the mold, and the exterior surface of the core is configured to mate with the interior surface/topography of the skin. At step 1736, the method 1700 includes using the modeling software to generate a model of the robotics assembly, and this may include importing definitions of robotic drives and determining where driver or actuator connections or links are to be provided to the skin (e.g., with load-spreading EAPs). This may also involve providing a digital model of a shell that has an outer surface matching that of the core. The shell may be modeled as a number of segments that can be readily fabricated with a prototyping machine or the like and then assembled to form the shell or housing for the robotic drive mechanisms. Both the shell and the robotics mechanisms are spatially linked in this manner to the other modeled layers/components (e.g., to the skin and the core used to form the skin).

With the initial modeling of the robotics completed, the method 1700 may include step 1740 that include updating the skin model to include EAPs. The EAPs (as discussed above) typically include skin locking EAPs, and these may be placed in locations where the skin should be attached to the underlying shell but move little or not at all (such as the tip of the nose and portions of the cheeks and so on). The EAPs also include load spreading EAPs, and these are positioned in portions of the skin that are to be driven by the robotic drivers/actuators and are initially positioned to suit the robotics mechanism modeled in step 1736 (or the EAPs may be set first and robotic drivers provided to suit each of the load-spreading EAPs). The EAPs may be positioned so as to have an accessible receptacle in the inner surface of the skin model and to be within the skin body (e.g., the modeling software may prevent positioning of an EAP outside or away from the modeled skin such as outside the scanned exterior surface of the subject).

In step 1750, the core model is updated based on selection or movement of EAPs to include or move mounting elements for each of the EAPs on its exterior surface. The shell model and/or robotics may be updated at this point, too, to have mounting posts/element and connector elements in the shell to suit the EAPs and to have driver links for each load-bearing EAP in the skin model. At step 1758, the mold is assembled to include the previously formed exterior components and also to include a core formed/fabricated according to the digital model. This core is mounted onto a reference block and the exterior mold components/shells may include a receiving surface for the block (as these were thrilled using the sculpt on a block). In step 1760, the skin is formed including pouring a volume of liquid (e.g., an elastomeric material such as silicone) into the cavity about the exterior surface of the core. The skin is allowed to harden/set, and the skin may be applied to a shell (formed also according to the digital model) with the EAPs attached to the shell mounting elements and to robotic driver links. The assembled robotic device (e.g., animated head) may then be tested for proper operation including realistic animation of the skin.

At step 1770, the method 1700 includes determining whether modifications of the model used to form the skin in step 1760 are desired and are to be implemented. The method 1700 is highly iterative, and such iterations are facilitated, by the use of the 3D modeling module and the linking of the various modeled components together to each other and to the alignment block. For example, testing of the skin on the robotic device may show that the eyebrows do not move realistically, and a designer may decide to replace a single EAP with two or three EAPs to more accurately show eyebrow movement. This requires updating also to the robotics assembly (e.g., addition of a driver, addition of a connection opening in the shell for the new driver, and proper location of these components in 3D space relative to the alignment block) and to the core to provide proper EAP mounting elements in correct locations.

At step 1780, the method 1700 includes the modeling software verifying the modification is acceptable based on parametric rules and linking limits. For example, another eyebrow EAP may be added but it has to be fit within the body or thickness of the modeled skin and suit any ruled defined by the robotics mechanisms (e.g., addition of a new load-spreading EAP may trigger a rule to create a new driver). In another example, the modification may be to move an EAP to a new location, and such modification may be limited by a driver's configuration as well as skin topography (or require a lengthening of a driver arm and relocation of a shell opening). When the modification is acceptable to the modeling software and its rules, the method 1700 continues in an iterative manner to updating the models of the skin, the core, and the robotics assembly model as needed in steps 1724 to 1750. Then, at 1758, a new skin may be fabricated for testing. The method 1700 may end at 1790 when no changes are desired at 1770.

Figure 18:
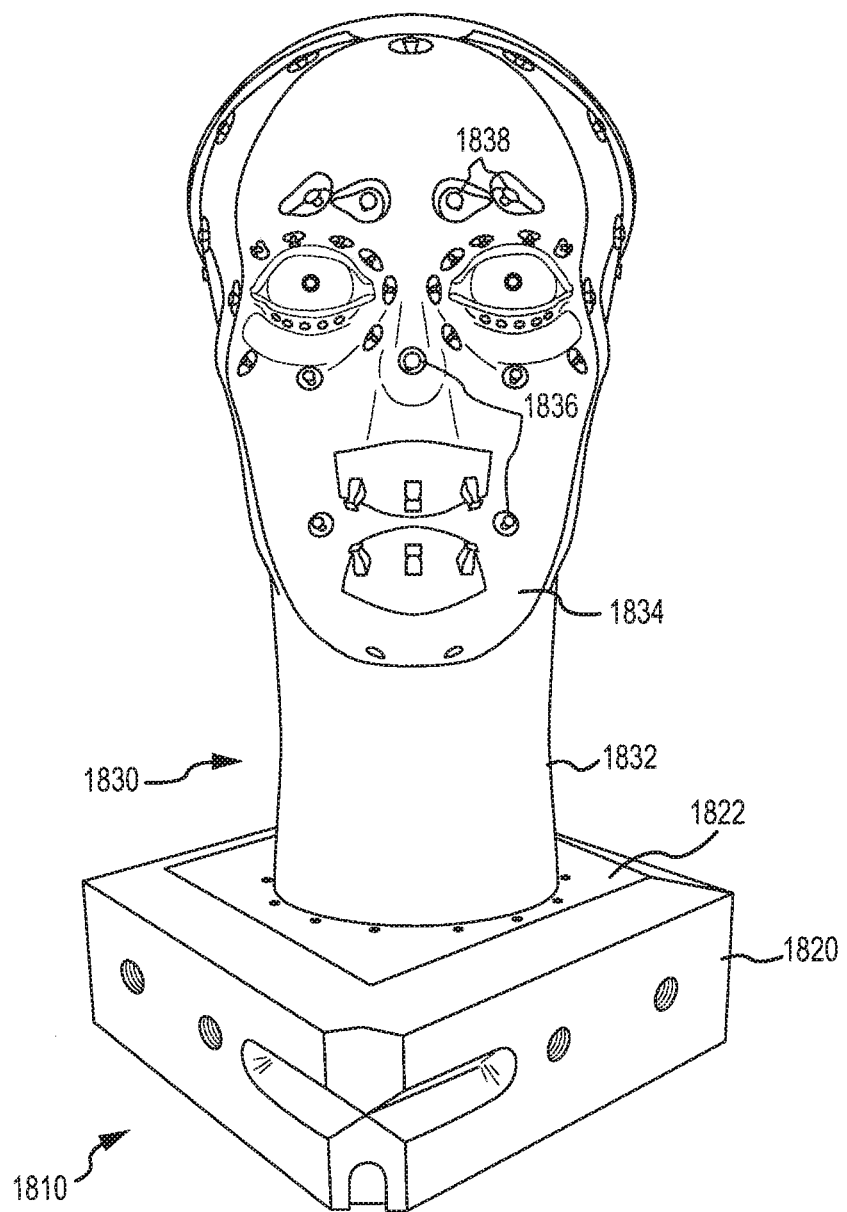
FIG. 18 is a front view of a mold core with EAP mounting elements/posts on an external surface of the core (e.g., the face surface of a head-shaped core) and with the core mounted to an alignment or location reference block to provide proper alignment of features (such as EAPs later attached to the EAP mounting elements)

FIG. 18 illustrates a core assembly 1810 for use in a mold assembly to form a skin. The core assembly 1810 includes an alignment or reference block 1820 that is machined to a digital model or definition, which is included in a modeling of skin and robotics assembly. The assembly 1810 includes a core 1830 fabricated according to a 3D digital model, and the core 1830 includes a neck or base portion 1832 corresponding to a similar feature of the scanned object that is attached to a mounting surface 1822 of the block 1820 (e.g., the neck 1832 is fabricated from a modeling of the neck 1208 of head 1206 shown in FIG. 12). In this manner, the core 1830 is accurately aligned with the block 1820 that was used to from an exterior mold that defines exterior skin features/topography.

The core 1830 includes an exterior face surface 1834 that is fabricated based on model of an interior surface of a skin (e.g., an offset distance from a scanned exterior surface such as the face 1207 of FIG. 12). The exterior surface 1834 includes a number of EAP mounting posts 1836 for each locking EAP included in a model of the skin by a 3D modeling module. The spatial linking of the skin model to the core model used to form core 1830 ensures proper locating of the posts 1836 on surface 1834. Also, the core 1830 includes a number of EAP mounting posts 1838 for receiving load-spreading EAPs. Again, these are accurately located due to the linking of the EAPs in the skin model with the model of the core provided by the 3D modeling module. Prior to insertion in a mold assembly and a pouring step, the EAPs would be applied to the EAP mounting elements 1836, 1838.

Figure 19:
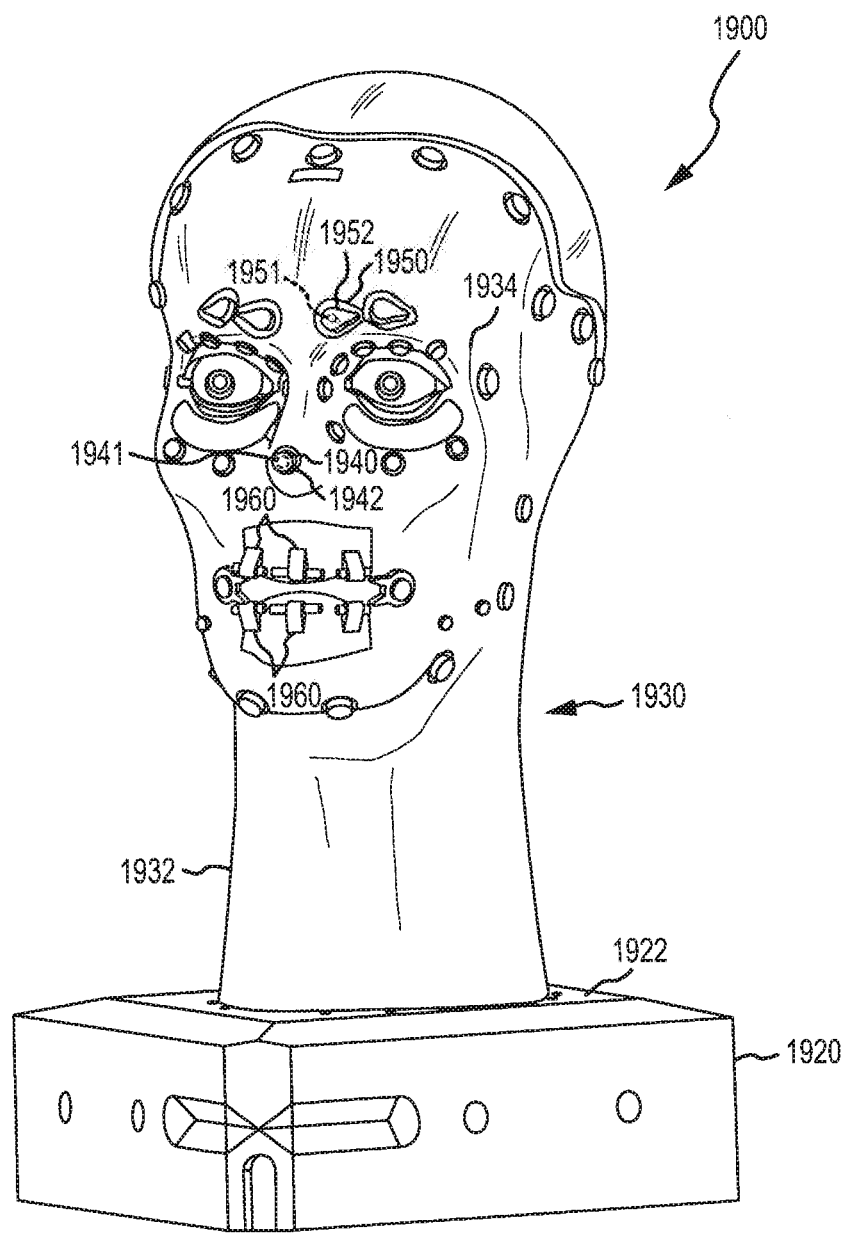
FIG. 19 is a front view, similar to that of FIG. 18, but showing a digital model (e.g., as may be seen in design GUI or the like) of a robotic shell/housing mounted on an alignment block and with EAPs on mounting posts/elements, with the shell having an exterior surface that matches the exterior surface of the core of FIG. 18.

Associated with the core 1830, FIG. 19 illustrates an image of a model of an assembly 1900 that is generated by a 3D modeling module and displayed on a monitor to a designer (e.g., in a GUI that allows reconfiguration of the components such as movement of an EAP, replacement of an EAP with a new design, and so on). The assembly 1900 is shown to include a model or digital representation of the block 1920 (e.g., block 1820) with a mounting surface 1922 matching a real world mounting surface (e.g., of a surface scanned of a subject or object on a reference block matching block 1920).

The assembly 1900 includes a representation 1930 of a model of a shell or housing for a robot head. The model representation 1930 indicates the shell is modeled as a number of segments that can be assembled to form a shell (e.g., fast prototyping of the shell components and then assembling them to form a hard shell for housing robotics). The segments include a neck segment 1932 that is attached to mounting surface 1922 of block 1920.

The segments also include facial segment 1934. The facial segment 1934 may include a skin connection 1940 in a nose portion including an EAP mounting element 1941 that may be provided on the shell surface of segment 1934. A skin-locking EAP 1942 is then shown to be applied to the mounting element 1941 (e.g., an EAP that is part of the skin model not shown). The facial segment 1934 also may include connection openings fair allowing robotic drivers/actuators or their arms/rods to extend outward to link with the skin via a load-spreading EAP. For example, the segment 1934 includes a connection opening 1950 in an eyebrow portion of the head, and a connector or EAP link 1951 of a driver modeled by the 3D modeling module may extend through this opening 1950. A load-spreading EAP 1952 may also be included in model 1900 (e.g., as an integral part of skin system, not shown). Further, the model 1900 may include other load-spreading EAPs of various designs such as lip EAPs 1960 that include a pair of load-spreading arms or wings.

FIG. 19 illustrates with assembly 1900 that the various "layers" or components of a robotic device are modeled in a manner in which the components are inter-linked and spatially related via a common reference point/surface 1922 (that can readily be provided in the physical world with an accurately machined alignment block). Hence, a designer can use a GUI to the 3D modeling module to make changes to the model 1900 and have it nearly instantaneously implemented (along with affects to linked/corresponding components stored in memory). For example, the EAP 1952 of the eyebrow may be moved 2 millimeters from its current location, and, if such movement is within the skin thickness and otherwise allowed by the linking/parametric rules implemented by the modeling software, the EAP 1952 is moved and the skin model updated. Also, though, the robotic model is updated to show the new position of the driver and its link 1951, the shell segment 1934 is updated to show a new position for connector opening 1950, and the core associated with the shell 1930 is also updated in memory to reflect the change.

Figure 20:
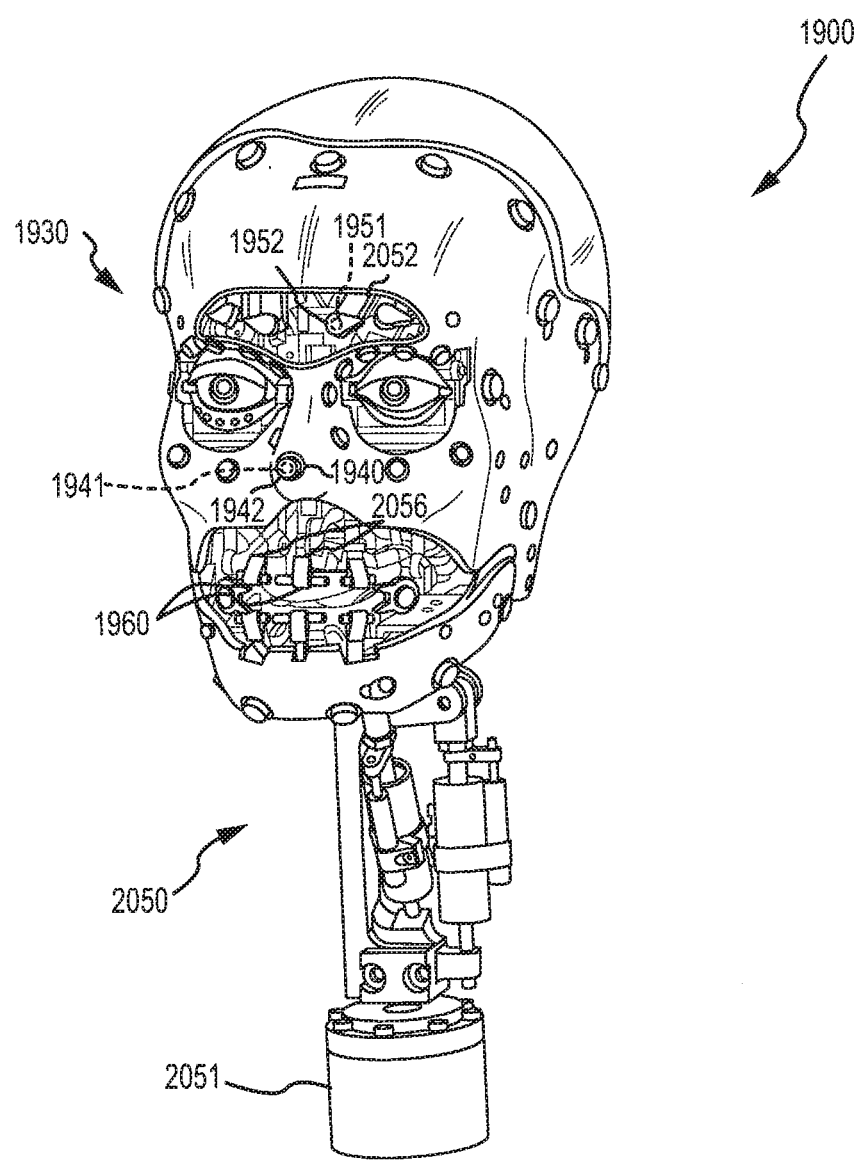
FIG. 20 is another front view of the digital model shown in FIG. 19 with several segments of the outer shell removed to show an underlying and spatially/functionally linked set of robotic mechanisms such as drivers with links to EAPs.

FIG. 20 illustrates a representation of the modeled assembly 1900 with several segments of the shell 1930 removed to reveal portions of the robotics 2050 that are concurrently modeled with the shell 1930 and linked in the model 1900 to corresponding features/components. For example, the robotics 2050 include a base or lower pedestal 2051, which may provide structural support for the robotics 2050, and the base 2051 may be spatially linked with a surface/position of the block 1920 (not shown in FIG. 20). The robotics 2050 also includes a driver or arm 2052 that is associated with link/connector 1951. Changes to the EAP 1952 may cause changes to the robotics 2050 including changes to the arm 2052 and/or connector 1951. Further, the robotics 2050 include drivers or arms 2056 that connect to the skin and drive animation of the skin via load-spreading EAPs 1960 in the upper lip of the face of the robotic device being modeled with assembly 1900. FIG. 20 is useful for showing that changes in the robotics 2050 can be used to accurately update linked components such as EAPs 1952, 1960 and vice versa (as well as shell 1930 and core built based on shell 1930).

With the design process described herein, a designer of a robot head or other skin-covered robotic device can accurately reproduce and prototype parts and also provide documentation (e.g., drawings of the parts and assemblies). The process takes away the laborious hand fitting of a shell, a robotic mechanism(s), and a covering skin. At any stage in the design process, changes can be made to the robotic mechanism, and such changes may be used to create new corresponding features such as a new hard shell or skin (e.g., a rapid prototype mold core). A new skin may then be poured that fits correctly via its EAPs to the shell and robotic mechanisms. The segmented shell and skin may be configured to be easily accessible and maintenance friendly. The enhanced molding when combined with figure finishing techniques improves the final result compared with prior techniques. Multiple alignment blocks may be made for different purposes such as a casting block, a rubber master of the sculpt, and a block for any fixtures desired. Again, the above description used the example of a robotic human or character head, but the process may be applied for nearly any skin-covered object.

We claim:

1. A method for fabricating a product with an artificial skin system, comprising:
    forming an exterior skin mold using a product prototype mounted on an alignment block, wherein a recess matching the alignment block is formed in the exterior skin mold;
    scanning the product prototype on the alignment block;
    with a modeling tool run by a processor of a computer, generating, based on data from the scanning of the product prototype, a three dimensional (3D) digital model of a mold core on a digital model of the alignment block;
    fabricating a core based on the 3D digital model of the mold core;
    positioning the fabricated core within the exterior skin mold, wherein the fabricated core is mounted upon the alignment block and the alignment block is received in the matching recess in the exterior skin mold to align the inner support structure with the exterior skin mold;
    filling a cavity between an exterior surface of the fabricated core and the exterior skin mold with an elastomeric material to form a skin, wherein the exterior surface of the fabricated core comprises a plurality of mounting elements;
    prior to the filling step, placing an elastomeric actuation piece (EAP) on each of the mounting elements;
    with the modeling tool, generating, based on the data from the scanning, a 3D model of the skin including the EAPs between an inner surface of the exterior skin mold and the exterior surface of the fabricated core; and
    with the modeling tool, moving one of the EAPs to a different 3D location within the model of the skin in response to user input and concurrently and automatically updating the model of the skin and the 3D digital model of the core based on the moving of the one of the EAPs to the different 3D location.

2. The method of claim 1, wherein the EAPs include a number of skin-locking EAPs and a number of load-spreading EAPs, the load-spreading EAPs each being adapted for mating with a driver of a robotic mechanism.

3. The method of claim 2, further comprising, with the modeling tool, generating a 3D model of an assembly of the robotic mechanisms including 3D locations of connection points of the drivers with the load-spreading EAPs and including an outer shell with mounting elements for the skin-locking EAPs and connection openings for the drivers providing a passageway for the drivers to connect with the load-spreading EAPs.

4. The method of claim 2, further comprising, with the modeling tool, adding an additional load-spreading EAP to the model of the skin in response to user input and, in response, updating a digital model of a robotics assembly to include a driver for the additional load-spreading EAP.

5. A computer-based method for fabricating an object with an exterior skin, comprising:
    storing in memory a 3D base geometry model defining surface geometry of the object positioned on an alignment block;
    with a modeling module run by a processor, generating a digital model of a mold core on the alignment block with an exterior surface with a topography based on the surface geometry of the object and an offset distance defining skin thickness;
    fabricating a core based on the digital model of the mold core;
    forming the exterior skin over the core by positioning the fabricated core mounted upon the alignment block in an exterior skin mold and filling the exterior skin mold with one or more materials, wherein the exterior surface of the digital model of the mold core includes a plurality of mounting posts;
    positioning an elastomeric actuation piece (EAP) on each of the posts prior to the forming step; and
    with the modeling module, storing a digital model of the exterior skin including the EAPs in the thickness of the model of the exterior skin and updating the model of the exterior skin to include movement of one of the EAPs in response to the movement of the one of the mounting posts or to include addition of an EAP associated with the additional one of the mounting posts on the exterior surface of the digital model of mold core.

6. The method of claim 5, further including, with the modeling module, modifying the digital model of the mold core including moving one of the mounting posts or adding an additional one of the mounting posts on the exterior surface.

7. The method of claim 6, further comprising generating a digital model of a shell for housing robotics, wherein the shell includes a skin-mounting surface with a topography matching the topography of the digital model of the mold core including ones of the mounting posts receiving skin-locking ones of the EAPs.

8. A method of modeling a robotic apparatus, comprising:
    scanning a sculpt, mounted on a location reference block, of an object;
    based on the scanning, operating a modeling program running on a computer to define a 3D digital model of a skin with an exterior surface matching an exterior geometry of the object, the model of the skin being spatially correlated with at least one surface of the location reference block;
    first positioning, with the 3D digital model in response to user input, a plurality of actuation pieces in the model of the skin, the actuation pieces including skin-locking pieces configured for mating with mounting posts on an outer shell of a robotics assembly and load-spreading pieces configured for mating with drivers of the robotic assembly;
    based on the first positioning, generating a digital model of the outer shell;
    second positioning in response to additional user input one or more of the actuation pieces in the model of the skin; and
    in response to the second positioning, updating the digital model of the outer shell.

9. The method of claim 8, wherein the digital model of the outer shell includes representations of the mounting posts at locations mapped to locations of the skin-locking pieces.

10. The method of claim 9, wherein the digital model of the outer shell further includes connector openings for linking elements for the drivers mapped to locations of load-spreading pieces.

11. The method of claim 8, further including using the model program to generate a digital representation of a mold core with an exterior surface corresponding to an outer surface of the outer shell.

12. The method of claim 11, wherein the digital representation of the mold core includes representations of the mounting posts at locations corresponding to the actuation pieces.

13. The method of claim 8, further comprising using the modeling program to generate a 3D digital model of the drivers of the robotic assembly including connection points to the load-spreading pieces at locations mapped to the locations of the load-spreading pieces in the model of the skin.

14. The method of claim 13, further comprising, based on user input, modifying one of the drivers and, in response, updating the model of the skin to move one of the load-spreading pieces.

15. The method of claim 14, further comprising updating the digital model of the outer shell including moving a location of a connector opening for the modified one of the drivers.

* * * * *